(12) United States Patent  (10) Patent No.: US 7,758,178 B2
Saitoh et al.  (45) Date of Patent: Jul. 20, 2010

(54) INK FIXING METHOD, INK FIXING APPARATUS, AND PRINTER

(75) Inventors: Haruki Saitoh, Miyagi (JP); Hijiri Ogata, Miyagi (JP); Masahiro Noguchi, Miyagi (JP)

(73) Assignee: Tohoku Ricoh Co., Ltd., Shibata-gun (JP)

( * ) Notice: Subject to any disclaimer, the term of this patent is extended or adjusted under 35 U.S.C. 154(b) by 435 days.

(21) Appl. No.: 11/517,379

(22) Filed: Sep. 8, 2006

(65) Prior Publication Data

US 2007/0058019 A1 Mar. 15, 2007

(30) Foreign Application Priority Data

Sep. 14, 2005 (JP) .............................. 2005-266421
Jun. 14, 2006 (JP) .............................. 2006-164605

(51) Int. Cl.
B41J 2/01 (2006.01)
(52) U.S. Cl. ..................................................... 347/102
(58) Field of Classification Search .............. 428/32.34; 525/531; 359/443; 313/512; 40/121
See application file for complete search history.

(56) References Cited

U.S. PATENT DOCUMENTS

| 5,302,191 | A | * | 4/1994 | Koutrakis et al. .............. 95/285 |
| 5,725,961 | A | * | 3/1998 | Ozawa et al. .............. 428/32.38 |
| 5,968,377 | A |   | 10/1999 | Yuasa et al. |
| 6,211,308 | B1 | * | 4/2001 | Saint Victor ................. 525/531 |
| 2004/0111929 | A1 | * | 6/2004 | Hickey et al. .................. 40/121 |
| 2004/0135504 | A1 | * | 7/2004 | Tamaki et al. ................ 313/512 |
| 2005/0068617 | A1 | * | 3/2005 | Mizuno et al. ............... 359/443 |
| 2005/0151821 | A1 | * | 7/2005 | Aoshima ..................... 347/112 |
| 2005/0196557 | A1 | * | 9/2005 | Ushiku ..................... 428/32.34 |
| 2006/0075914 | A1 |   | 4/2006 | Kawano |

FOREIGN PATENT DOCUMENTS

| JP | 3040358 | 3/2000 |
| JP | 2001-171221 | 6/2001 |
| JP | 2002-58995 | 2/2002 |
| JP | 2004-103423 | 4/2004 |
| JP | 2004-136672 | 5/2004 |
| JP | 2005-523803 | 8/2005 |
| WO | WO 03/089479 A2 | 10/2003 |

* cited by examiner

Primary Examiner—Stephen D Meier
Assistant Examiner—Alexander C Witkowski
(74) Attorney, Agent, or Firm—Oblon, Spivak, McClelland, Maier & Neustadt, L.L.P.

(57) ABSTRACT

To provide a highly human- and environment-friendly ink fixing method that is excellent in energy efficiency, operability and ink-fixing property and has a simple process, an ink fixing apparatus that is excellent in energy efficiency, operability and ink-fixing property and is a highly human- and environment-friendly, simple and compact apparatus, and a printer that is equipped with the ink fixing apparatus and can provide high-quality images at low cost. The ink fixing apparatus of the present invention includes at least fixing a print ink to a base material using a discharge generated between electrodes under pressure close to atmospheric pressure, wherein the print ink includes at least a non-volatile organic compound bearing a carboxylic group and includes no photopolymerization initiators.

21 Claims, 15 Drawing Sheets

FIG. 13A (Black Solid Color Printing)
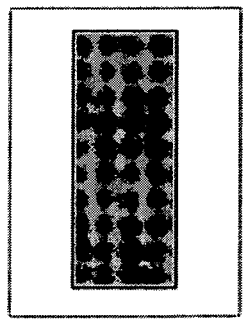
↔
Width: 75 mm
OA Paper
FIG. 13B (Adhesion of Masking Tape)
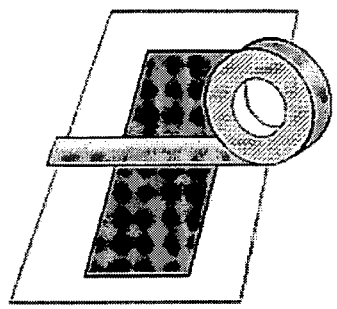
FIG. 13C (Pressed at a Pressure of 1.2 g/ cm$^2$)
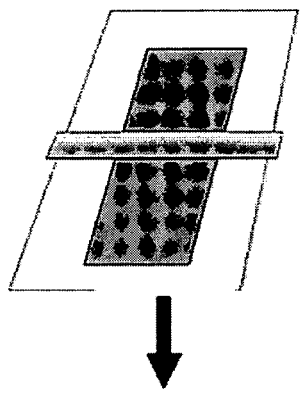
FIG. 13E (Evaluation of Adhesion Surface of Tape for Ink Presence)
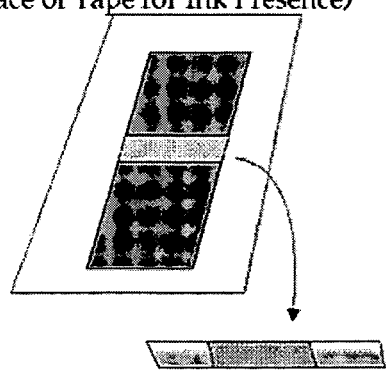
FIG. 13D (Tape Separation)
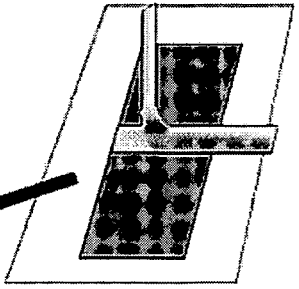

FIG. 14A
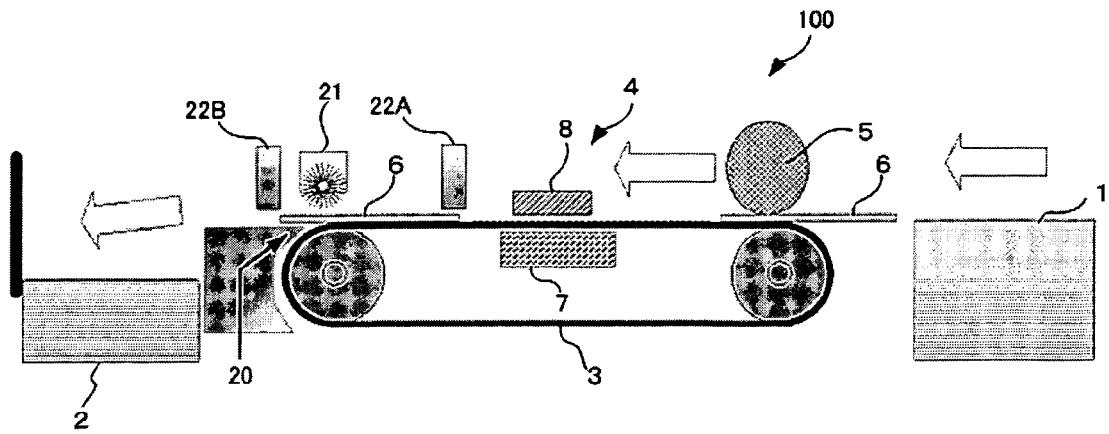
FIG. 14B(1)
100% Density Printing
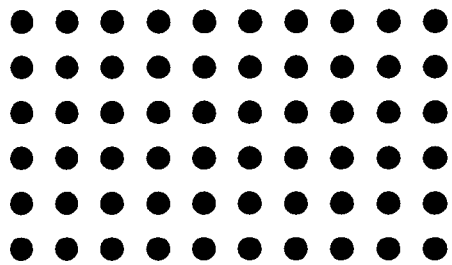
FIG. 14B(2)
25% Density Printing
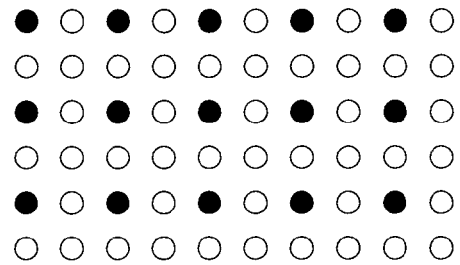
FIG. 15
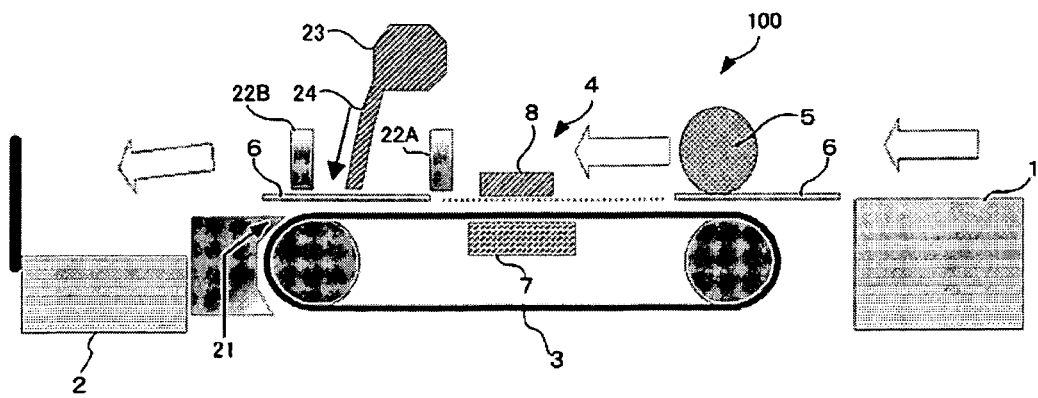

FIG. 19A(1)
FIG. 19A(2)
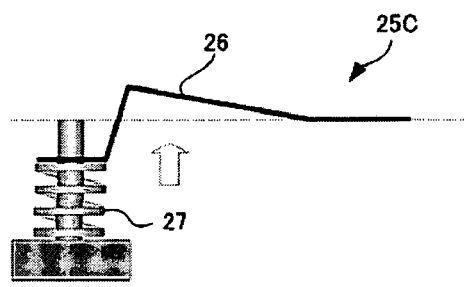
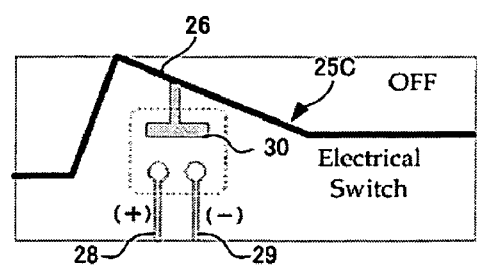
FIG. 19B(1)
FIG. 19B(2)
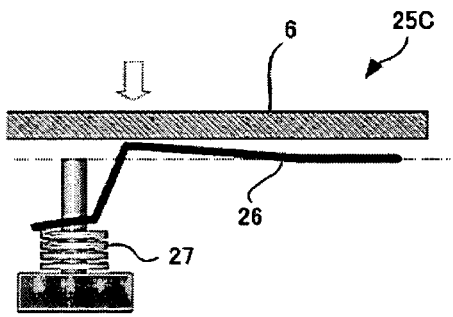
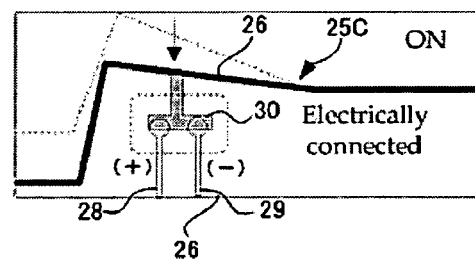

FIG. 20A
FIG. 20B
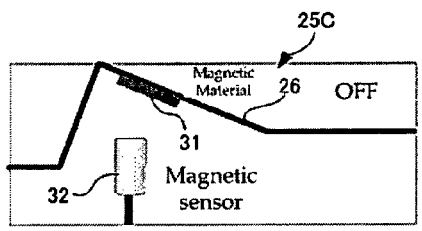
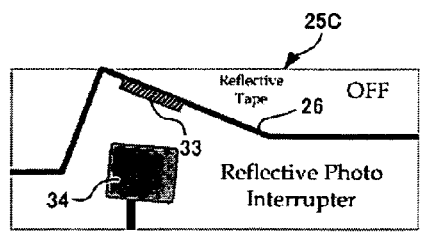
FIG. 21A
FIG. 21B
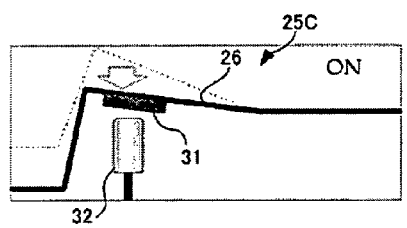
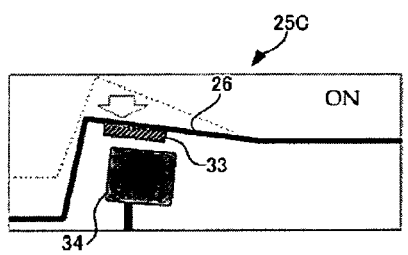
FIG. 22
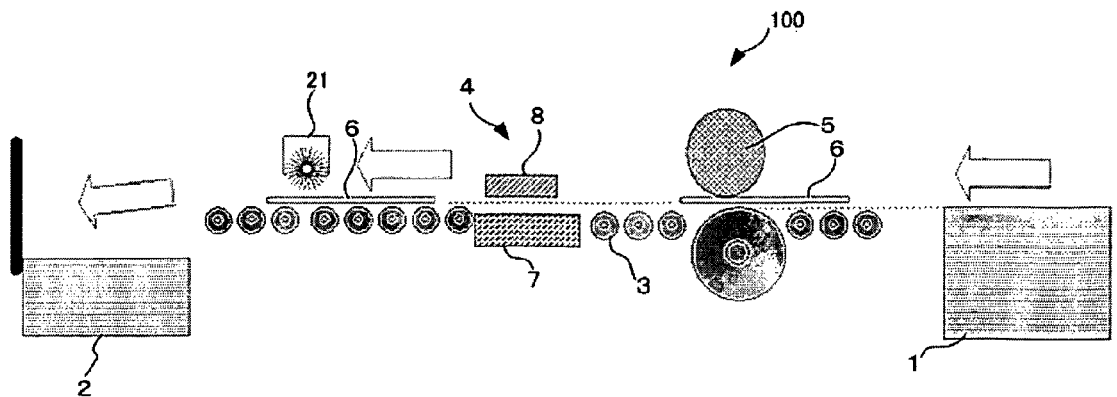

INK FIXING METHOD, INK FIXING APPARATUS, AND PRINTER

BACKGROUND OF THE INVENTION

1. Field of the Invention

The present invention relates to a highly human- and environment-friendly ink fixing method that is excellent in energy efficiency, operability and ink-fixing property and has a simple process, to an ink fixing apparatus that is excellent in energy efficiency, operability and ink-fixing property and is a highly human- and environment-friendly, simple and compact apparatus, and to a printer equipped with the ink fixing apparatus.

2. Description of the Related Art

Conventionally, printers such as stencil printers and ink-jet printers have used UV curable inks for printing operations that require high ink fixing property, and printers that cure inks by irradiation with UV light are disclosed. Such printers using UV curable ink are capable of curing the ink that has been applied onto a paper sheet in a relatively short time by irradiating it with UV light, fixing the ink to the paper sheet and thus preventing the generation of so-called "offset" that occurs during a continuous run (see Japanese Patent Application Laid-Open (JP-A) No. 2001-171221).

In such a printer that uses UV curable ink, an ink fixing apparatus for applying UV light is arranged behind a printing unit, where a paper sheet supplied with UV curable ink, ejected from the printing unit, is transferred for the fixing of the ink to the paper sheet by irradiation with UV light.

This ink fixing apparatus, however, has a problem that it increases apparatus size and thus requires a very large installation area, because a number of mechanical elements or components are required, such as an air-cooling fan and/or a heat exhausting duct for cooling the heat from a UV lamp, a shutter mechanism for opening and closing the fixing apparatus as needed, a shielding plate for preventing leakage of UV light to the outside of the fixing apparatus, etc.

With respect to ink fixing property, for example, UV curable inks with low light transmittance (e.g., black ink) require higher curing energy for full ink fixing than those with high light transmittance (e.g., yellow and blue inks).

For this reason, the ink fixing apparatus undesirably requires, as a standard, large curing energy sufficient to cure and fix UV curable inks with low light transmittance (e.g., black ink) i.e., inks that are most difficult to be cured. This causes increases in power source cost and maintenance cost.

In addition, it is known that the UV curing reaction is easily inhibited by oxygen present in the air to cause reduction in curing characteristics. To solve this problem, JP-A No. 2004-136672 discloses an ink fixing apparatus equipped with (1) a fixing member that can admit light covering the ultraviolet spectrum, (2) a transferring member arranged so as to face the fixing unit, and (3) a pressuring unit for pressing the transferring member against the fixing member, wherein a printed recording medium having UV curable ink is held between the fixing and transferring members and thereby the UV curable ink on the recording medium is cured by irradiation with UV light by means of the fixing member. By pressing the recording medium against the fixing member using the pressuring unit, it is possible to achieve curing (fixing) of UV curable ink by UV light and improvement in the curing characteristics by oxygen blocking as well.

General UV curable inks are monomers or oligomers before they are polymerized (cured), which are skin irritants having a pungent odor; they may be harmful to the human body and accordingly, it is desirable that no uncured portions be produced.

Depending on the condition under which UC curable ink is irradiated with UV light, though, it may result in the generation of poorly-cured portions (i.e., non-fixed ink). If this non-fixed ink comes off the recording medium in the course of printing, it may result not only in poor image quality, but also in negative influences on the environment and/or a person who touches the resulting printed matter. Even trace amounts of non-fixed ink may affect the human body when UV curable ink is specifically used for the printing on food packages.

In addition to the foregoing ink fixing apparatus using UV curable ink, there is disclosed a curing unit that uses electron beam (EB) in order to make inks with high pigment concentration available and to increase the thickness of ink film in a case of partial printing, e.g., printing of marks or lines on a print medium. In contrast to UV light, the transmittance of electron beam is not dependent on the pigment's concentration. Accordingly, the electron beam has the advantage of being capable of providing highly concentrated printed or coated matter with high visibility.

An electron beam irradiation device, however, has a problem that it requires an acceleration voltage of as high as 150 kV or more, causing the electron beam to directly act on a base material or even on a member under the base material to reduce physical its properties.

In a case of partial printing where the surface of a print medium is not necessarily patterned entirely (e.g., printing of marks and/or lines), it is ideal that only ink-supplied portions are irradiated with electron beams. In order to achieve this with a conventional electron beam irradiation device, operations electron beam's operations (e.g., electron beam focusing) are required, thus requiring a larger electron beam irradiation device. Such an irradiation device is, however, difficult to manufacture and irradiation of relatively small targets (e.g., marks and lines) with electron beams has been inefficient.

In addition, proposals have been made to perform plasma treatment on the surface of a target for the purpose of improving adhesion and surface modification of the target (see Japanese Patent (JP-B) No. 3040358, JP-A No. 2002-58995, and JP-A No. 2004-103423). For example, JP-B No. 3040358 discloses a method in which a solid dielectric is provided to at least one of electrodes, and an electrical field of 1 to 100 kV/cm intensity is applied for glow discharge plasma treatment under pressure close to atmospheric pressure.

JP-A No. 2002-58995 discloses plasma treatment in which the waveform of voltage to be applied across electrodes is changed to an alternating current voltage waveform with no idle time and in which the rise time of this alternating current voltage waveform is set to 100 μsec or less.

Moreover, JP-A No. 2004-103423 discloses plasma treatment in which discharge is allowed to occur in a discharge space under pressure close to atmospheric pressure by applying either a pulse wave of alternating positive and negative components or an alternating current voltage to each of a pair of electrodes at the same time and by causing the two waves to be in phase with each other with different polarities.

These plasma treatments, however, require complicated, troublesome adjustments for the production of an uniform glow discharge plasma and thus cause increase in the apparatus size. In addition, these patent literatures disclose the usage of plasma treatment for the improvement of film adhesion and film deposition, but never suggest or disclose their usage for ink fixing in a printer.

Thus the inventions that are disclosed in JP-B No. 3040358, JP-A No. 2002-58995 and JP-A No. 2004-103423 entail difficulty in the adjustment of voltage and are more likely to cause inefficiency due to concentration of discharge, resulting non-uniform energy rays on a target. Moreover, desirable ink fixing property may not be obtained when these inventions are applied to an ink fixing process.

Meanwhile, a technology has been disclosed in which print ink that contains a photoactivatable compound or photopolymerization initiator (e.g., photoinitiator, photoactivatable acid, or photoactivatable base) is cured in a plasma discharge chamber (see JP-A No. 2005-523803).

In this case, however, it is essential that the foregoing photoactivatable compound (photopolymerization initiator) be used as an ink ingredient to cure the print ink. In addition, a special reduced pressure container is required (preferably a reduced pressure container equipped with an inlet and an outlet), and the container needs to be filled with a particular gas such as nitrogen gas, helium gas, argon gas, neon gas, krypton gas, or xenon gas. Also, the ink curing needs to be carried out under a strict condition for excellent effects, making a fixing apparatus and/or fixing steps so complicated that it may result in increased costs. Since a special synthesized chemical, a photoactivatable compound, needs to be added to the print ink, there is a problem that ink cost will increase. Furthermore, such a photoactivatable compound contains a skin irritant, and in the event that non-fixed ink is remained on a printed matter as described above, it affects the human body when brought in contact with the skin via the printed matter. When the content of the photoactivatable compound is increased for improved ink fixing property, the ink sensitivity increases so much that curing reaction will proceed even by irradiation with a low-level light other than fixing light (e.g., cosmic rays such as $\alpha$-ray), thereby causing stability problems (e.g., reduced storage stability, and ink fixation to the printer components).

There have been no technologies regarding to print inks containing no photoactivatable compounds, to an electrode structure that uses, without the need of pressure control, a plasma in an atmospheric pressure space for the curing (fixing) of ink, and to an optimal peripheral system, including a transferring unit required by the electrode structure and a unit for removing by-product gases.

Accordingly, a highly human- and environment-friendly ink fixing method that is excellent in energy efficiency, operability and ink-fixing property and has a simple process, an ink fixing apparatus that is excellent in energy efficiency, operability and ink-fixing property and is a highly human- and environment-friendly, simple and compact apparatus, and a printer that is equipped with the ink fixing apparatus and can provide high-quality images at low cost have not been provided; at present, the prompt provision of them has been demanded.

SUMMARY OF THE INVENTION

It is therefore an object of the present invention to provide a highly human- and environment-friendly ink fixing method that is excellent in energy efficiency, operability and ink-fixing property and has a simple process, an ink fixing apparatus that is excellent in energy efficiency, operability and ink-fixing property and is a highly human- and environment-friendly, simple and compact apparatus, and a printer that is equipped with the ink fixing apparatus and can provide high-quality images at low cost.

The means for solving the foregoing problems are as follows.

The ink fixing method of the present invention includes at least fixing a print ink to a base material by means of a discharge generated between first and second electrodes under pressure close to atmospheric pressure, wherein the print ink comprises at least a non-volatile organic compound bearing a carboxylic group and comprises no photopolymerization initiators.

In the ink fixing step of the ink fixing method of the present invention, a print ink that contains at least a non-volatile organic compound bearing a carboxylic group and contains no photopolymerization initiators is fixed to a base material using a discharge generated between the electrodes under pressure close to atmospheric pressure (hereinafter also referred to as an "atmospheric plasma discharge"). It is thus possible to achieve, simple, efficient, and inexpensive ink fixing, which is also capable of preventing the generation of non-fixed ink and of offering excellent ink fixing property and no negative impacts on the human body and environment.

The ink fixing apparatus of the present invention is an ink fixing apparatus using the ink fixing method of the present invention. The ink fixing apparatus of the present invention includes at least an ink fixing unit configured to fix a print ink to a base material by use of a discharge generated between electrodes under pressure close to atmospheric pressure, wherein the print ink comprises at least a non-volatile organic compound bearing a carboxylic group and comprises no photopolymerization initiators.

In the ink fixing apparatus of the present invention a print ink that contains at least a non-volatile organic compound bearing a carboxylic group and contains no photopolymerization initiators is fixed to a base material using a discharge generated between electrodes under pressure close to atmospheric pressure. It is thus possible to provide an ink fixing apparatus that is a highly human- and environment-friendly, simple and compact apparatus offering excellent energy efficiency and operability.

The printer of the present invention includes the ink fixing apparatus of the present invention.

The printer of the present invention is a compact, simple printer that offers excellent energy efficiency and operability, allowing image formation with excellent ink fixing property as well as highly human- and environment-friendly printing.

BRIEF DESCRIPTION OF THE DRAWINGS

FIG. 5A is a perspective view of an example of a grounded electrode used for the ink fixing apparatus of the present invention or the like.

FIG. 6A is a perspective view of an example of a non-grounded electrode used for the ink fixing apparatus of the present invention or the like.

FIG. 7A is a perspective view of an example of a non-grounded electrode used for the ink fixing apparatus of the present invention or the like.

FIG. 8A is a perspective view of an example of a non-grounded electrode used for the ink fixing apparatus of the present invention or the like.

FIG. 13A is a schematic view showing the first step of Ink Fixing Property Evaluation 1.

FIG. 13B is a schematic view showing the second step of Ink Fixing Property Evaluation 1.

FIG. 13C is a schematic view showing the third step of Ink Fixing Property Evaluation 1.

FIG. 13D is a schematic view showing the fourth step of Ink Fixing Property Evaluation 1.

FIG. 13E is a schematic view showing the fifth step of Ink Fixing Property Evaluation 1.

FIG. 14A is a schematic view of an example of the printer of the present invention using a neutralizing brush.

FIG. 14B(1) is a schematic view of 100% density printing of a print pattern (dots).

FIG. 14B(2) is a schematic view of 25% density printing of a print pattern (dots).

FIG. 15 is a schematic view of an example of the printer of the present invention using a neutralizing ionizer.

FIGS. 19A(1) and 19A(2) each show an side view of an OFF-state contact sensor using both a mechanical unit and an electrical contact.

FIGS. 19B(1) and 19B(2) each show an side view of an ON-state contact sensor using both a mechanical unit and an electrical contact.

FIG. 20A is a side view of an OFF-state contact sensor using a mechanical unit and a magnetic sensor.

FIG. 20B is a side view of an ON-state contact sensor using a mechanical unit and a magnetic sensor.

FIG. 21A is a side view of an OFF-state contact sensor using a mechanical unit and an optical sensor.

FIG. 21B is a side view of an ON-state contact sensor using a mechanical unit and an optical sensor.

FIG. 22 is a schematic view of an example of the printer of the present invention using a roller member.

DESCRIPTION OF THE PREFERRED EMBODIMENTS

Figure 1:
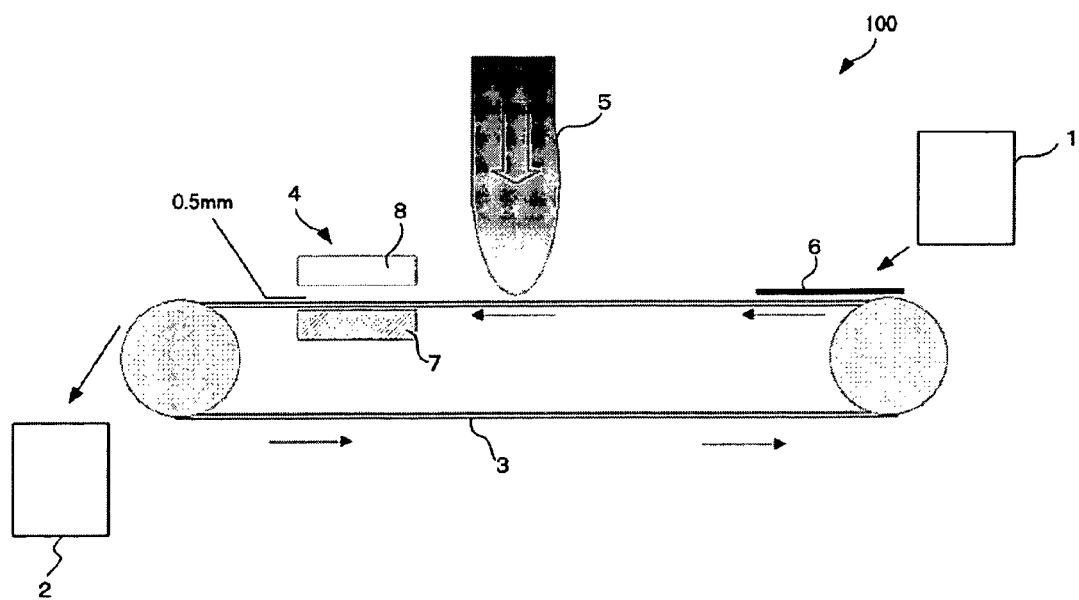
FIG. 1 is a schematic cross-sectional view showing an example of an ink fixing apparatus or printer of the present invention.

Ink Fixing Method and Ink Fixing Apparatus

The ink fixing method of the present invention includes at least an ink fixing step of fixing ink that has been provided on a base material to the base material, and further includes an ink supplying step, a discharging step for discharging by-product (e.g., a gas removing step), a base material transferring step, an operation controlling step for controlling the ink fixing step, a base material inputting step, a base material outputting step, and additional step(s) selected on an as-needed basis.

The ink fixing apparatus of the present invention includes at least an ink fixing unit configured to fix ink that has been provided on a base material to thereto, and further includes an ink supplying unit, a discharging unit for discharging by-products (e.g., a gas removing unit), a base material transferring unit, an operation controlling unit for controlling the ink fixing unit, a base material inputting unit, a base material outputting unit, and additional unit(s) on an as-needed basis.

The ink fixing method of the present invention uses the ink fixing apparatus of the present invention.

The ink fixing method may perform an ink fixing step on a base material on which print ink (hereinafter simply referred to as "ink" in some cases) has been previously supplied, or may previously supply ink on the surface of a base material by means of an ink supplying step prior to the ink fixing step.

The ink fixing apparatus may receive a base material on which print ink (hereinafter simply referred to as "ink" in some cases) has been previously supplied, or may receive a base material having no ink followed by supplying of ink on the surface of the base material by means of an ink supplying unit in the ink fixing apparatus.

Hereinafter, the ink fixing apparatus of the present invention will be described, and the ink fixing method of the present invention will also be described through the description of the ink fixing apparatus.

<Ink Fixing Unit>

The ink fixing unit includes at least an energy ray-providing part for providing active energy rays to the surface of a base material, which the active energy rays have been generated as a result of a discharge generated between a grounded electrode (first electrode) and a non-grounded electrode (second electrode) under pressure close to atmospheric pressure (an atmospheric plasma discharge).

—The Energy Ray-Providing Part—

The energy ray-providing part ensures fixing of ink to the surface of a base material by applying active energy rays to the surface of the base material that have been generated as a result of a discharge generated between electrodes under pressure close to atmospheric pressure (an atmospheric plasma discharge). In this way, a print ink that contains at least a non-volatile organic compound bearing a carboxylic group and contains no photopolymerization initiators is cured, thereby achieving ink fixing that is excellent in adhesion and fixing properties.

Herein the phrase "close to atmospheric pressure" means that the pressure upon ink fixing is about 0.07 to 2 MPa, with the difference in the atmospheric pressure depending on the altitude taken into consideration. It is only necessary not to decompress the chamber upon plasma discharge, and thus the pressure level is not specifically limited to this range.

For a discharge to occurs between electrodes under pressure outside this range (i.e., from 0.07 to 2 MPa), it requires a special reduced pressure container (e.g., a plasma discharge chamber) and/or special step(s), which may make a whole process complicated and costly. The upper limit is set to 2 MPa for the following reason: When a base material (paper sheet) is allowed to pass through a 0.5 mm space between a pair of electrodes using a transferring belt at a speed of 200 cm/sec, the pressure that is created by air flow partially generated in the space is about 2 MPa, and that too is included in the range.

The active energy rays are generated as a result of a discharge generated between electrodes under pressure close to atmospheric pressure (an atmospheric plasma discharge). It is assumed that they are either electron beams or charged particle beams.

The print ink used in the present invention is one that contains a non-volatile organic compound bearing a carboxylic group and no photopolymerization initiators. Electrons or charged particles generated as a result of atmospheric plasma discharge are accelerated by an intense electric field and collide with the non-volatile compound (an ink ingredient) to cause a chemical reaction (more specifically, an esterification reaction that involves elimination of water) to take place. It is thus assumed that the liquid ingredients of the ink are solidified on the base material, i.e., the ink chemically changes to a waxy material.

This was demonstrated by FTIR measurements made before and after an ink fixing operation—a major peak of ester bonds, not observed before the ink fixing operation, was observed after the ink fixing operation.

In order for a chemical reaction to occur that ensures practically sufficient ink fixing property, it is preferable that the electrical field intensity between electrodes be greater than 100 kV/cm. If the electrical field intensity is 100 kV/cm or less, it may be difficult for ink to be fixed to a base material.

For efficient application or contact-provision of active energy rays generated as a result of an atmospheric plasma discharge onto a base material which has been supplied with ink, it is required that an efficient novel surface discharge be occurred on the base material.

In this case, the discharge between electrodes in an atmospheric air (dielectric substance) is as a result of a number of small plasma columns (also referred to as "streamer") generated by voltage applied across the electrodes. To achieve extensive ink fixing on the base material, the electrode structure needs to be so designed that the plasma columns never be generated at a particular point. Although it is possible to adopt a needle electrode, where a discharge occurs at the tip of the electrode, and to move the need electrode all over the base material surface at a high speed, this method is not practical because it cause reduction in fixing speed, fixing efficiency, and fixing reliability.

To achieve extensive, uniform application or contact-provision of active energy rays, it is ideal that electrodes be configured such that a plurality of high-electrical field portions where discharge take places easily (hereinafter referred to as "discharge portions) and a plurality of non-discharge portions are formed in a space between the electrodes, and such that a base material is transferred in the space so that the entire surface thereof can be processed. Note that the term "non-discharge portions" means portions where discharge is less likely to take place and which are lower in electrical field intensity than the foregoing high-discharge portions; no or little discharge takes place there.

When there is a variation in the electrical field intensity among the multiple high-discharge portions in the above-described electrode structure, a discharge may concentrate at a high-discharge portion having a maximum electrical field intensity. For this reason, all of the high-discharge portions need to have the same electrical intensity—at least greater than 100 kV/cm.

The grounded electrode is preferably formed of a conductive electrode plate (e.g., a metal plate or a conductive member other than metal plates), and it is preferable that at least a part—more preferably whole—of the grounded electrode be covered with a dielectric material with a thickness of 0.1 mm to 10 mm and a permittivity of 10 or less. The use of an electrode plate covered with a dielectric material as a grounded electrode is particularly important to overcome troubles associated with discharge.

Examples of the conductive member include conductive thin films such as metal thin films, semi-conductive oxide thin films, conductive nitride thin films, and conductive boride thin films.

Examples of metals used for these metal films include gold, silver, platinum, copper, aluminum, and chrome.

Examples of metal oxides used for the semi-conductive oxide thin films include indium oxide ($In_2O_3$), tin oxide ($SnO_2$), zinc oxide (ZnO), titanium oxide ($TiO_2$), and composite materials thereof (e.g., zinc oxide+tin oxide: $Zn_2SnO_4$, indium oxide+zinc oxide: $In_2O_3$—ZnO, and indium oxide+tin oxide: $In_2O_3$—$SnO_2$).

Examples of nitrides used for the conductive nitride thin films include titanium nitride (TiN), zirconium nitride (ZrN), and hafnium nitride (HfN).

Examples of borides used for the conductive boride thin films include lanthanum boride ($LaB_6$).

The method of forming the conductive thin film is not particularly limited and any known methods can be used; for example, a sputtering method can be used.

If the electrode plate is covered with a dielectric material with a permittivity of greater than 10, discharge concentration is more likely to occur. This not only causes great energy consumption, but also makes holes in a base material and, in some cases, the base material us scorched or burned.

Examples of dielectric materials with a permittivity of 10 or less include inorganic materials such as mica (4.5-7.5), glass (3.7-10), Pyrex® glass (4.8), aluminum oxide (2.14), quarts glass (3.5-4.0) and borosilicate glass (4.0-5.0), and organic materials such as vinyl chloride resins (5.8-6.4), urethanes (6.5-7.1), epoxy resins (2.5-6.0), crude rubbers (2.1-2.7), vulcanized rubbers (2.0-3.5), natural rubbers (2.7-4.0), mineral oils (2-2.5), ethylene trifluoride resins (2.4-2.5), ethylene tetrafluoride resins (2, registered trade name: Teflon), fluorine resins (4.0-8.0), silicone resins (3.5-5.0), silicone rubbers (3.0-3.5), wholly aromatic polyimides (3.2-3.4), semi-aliphatic polyimides (2.8-3.0), wholly aliphatic polyimides (2.5-2.6), polyester resins (2.8-8.1), polycarbonate resins (2.9-3.0) and paper (2.0-2.5). Note that the number enclosed in parentheses represents permittivity.

It is preferable to use an electrode plate covered with a dielectric material of 0.1 mm to 10 mm thickness as the grounded electrode (first electrode) because by doing so it is possible to maintain a stable novel surface discharge for increased fixing property and to provide a safety mechanism by which an unexpected occurrence of an arc discharge can be prevented.

If the thickness of the dielectric material is less than 0.1 mm, the dielectric material becomes so thin that it may result in exposure of metal of the grounded electrode as a result of minor operational mistakes or handling errors. In this case, an arc discharge occurs and thus the metal electrodes may be damaged and/or peripheral members may be scorched or burned. If the thickness of the dielectric material is greater than 10 mm, a larger power source capacity is required to ensure practically useful ink fixing speed. For this reason, it may be difficult to achieve size reduction and/or cost reduction.

For the non-grounded electrode (second electrode), any of the following non-grounded electrodes (1), (2) and (3) can be effectively used for the ink fixing operation of the present invention.

(1) A non-grounded electrode which is either a conductive electrode plate (e.g., a metal thin film described above) or a metal plate, having a plurality of protrusions on a surface facing the grounded electrode. In addition, the tip of each protrusion, when seen from its cross section cut by a plane that is vertical with respect to the grounded electrode's surface, at least has a curved portion with a curvature radius (R) of 0.5 mm to 10 mm.

If the curvature radius (R) is less than 0.5 mm, the tips of the protrusions are more sharpened due to sputtering effects that occur along with discharge, allowing discharge concentration to occur in some cases. This not only causes unevenness of ink fixing performance, but also increases the likelihood of damages to the base material and ignition of the base material. If the curvature radius (R) is greater than 10 mm, the position where a discharge takes place does not remains the same, thereby causing discharge to take place from one position to another. Thus, in order to equally treat the base material's surface, a non-grounded electrode member with a larger area needs to be provided, which means that the spatial capacity necessary to install electrodes increases when attempting to achieve high-speed ink fixing to the base material; compact housing cannot therefore be achieved, leading to increased apparatus size.

(2) A non-grounded electrode which is either a circular cylinder or a circular tube, the circular cylinder and the circular tube both having a diameter of 1 mm to 20 mm and being made of at least metal or conductive material other than metal.

If the diameter of the conductive circular cylinder or circular tube is less than 1 mm, its diameter decreases and thus it is more sharpened due to sputtering effects that occur together with discharge, allowing discharge concentration to occur in some cases. This not only causes unevenness of ink fixing performance, but also increases the likelihood of damages to the base material and ignition of the base material. If the diameter is greater than 20 mm, the spatial capacity necessary to install electrodes increases when attempting to achieve high-speed ink fixing to the base material; compact housing cannot therefore be achieved, leading to increased apparatus size.

(3) A non-grounded electrode made of at least a metal or a conductive member:

(3-1) A non-grounded electrode obtained by electrically connecting a plurality of rectangular conductive members;

(3-2) A non-grounded electrode obtained by bending one or more long conductive members for several times and electrically connecting them; or (3-3) A non-grounded electrode obtained by electrically connecting one or more sets of rectangular conductive members to one or more bent conductive members that have been obtained by bending long conductive members for several times.

In addition, the tip of each of the protrusions formed on the non-grounded electrode facing the grounded electrode, when seen from its cross section cut by a plane that is vertical with respect to the grounded electrode's surface, at least has a curved portion with a curvature radius (R) of 0.5 mm to 10 mm.

If the curvature radius (R) of the curved portion is less than 0.5 mm in the non-grounded electrodes listed in (3-1), (3-2) and (3-3), the tips of the protrusions are further sharpened due to sputtering effects that occur together with discharge, allowing discharge concentration to occur in some cases. This not only causes unevenness of ink fixing performance, but also increases the likelihood of damages to the base material and ignition of the base material. If the curvature radius (R) is greater than 10 mm, the position where discharge takes place does not remains the same—discharge takes place from one position to another. Thus, in order to equally treat the base material's surface, a non-grounded electrode member with a larger area needs to be provided, which means that the spatial capacity necessary to install electrodes increases when attempting to achieve high-speed ink fixing to the base material; compact housing cannot therefore be achieved, leading to increased apparatus size.

Specific examples of the non-grounded electrode are shown in FIGS. 5 to 10. However, the non-grounded electrode is not specifically limited to these as long as features of the foregoing non-grounded electrodes are satisfied.

Figure 5A:
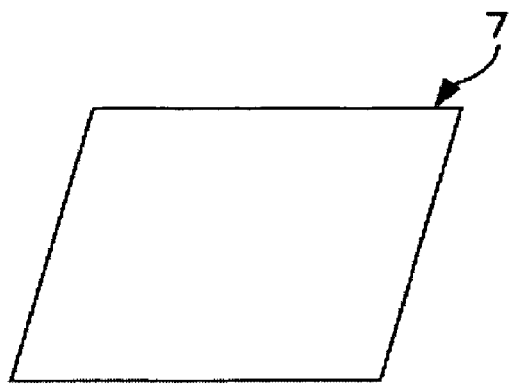
Figure 5B:
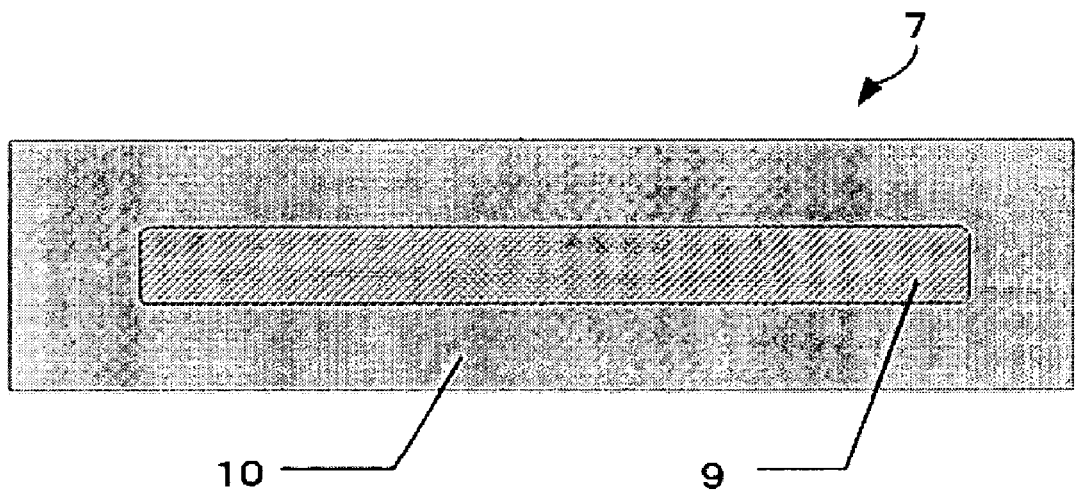
FIG. 5B is a cross-sectional view of the grounded electrode shown in FIG. 5A.

FIGS. 5A and 5B each shows a specific example of a grounded electrode 7 in which a metal plate 9 is entirely covered with a dielectric material 10, FIG. 5A shows a perspective view of the grounded electrode 7, and FIG. 5B shows a cross-sectional view thereof.

Figure 6A:
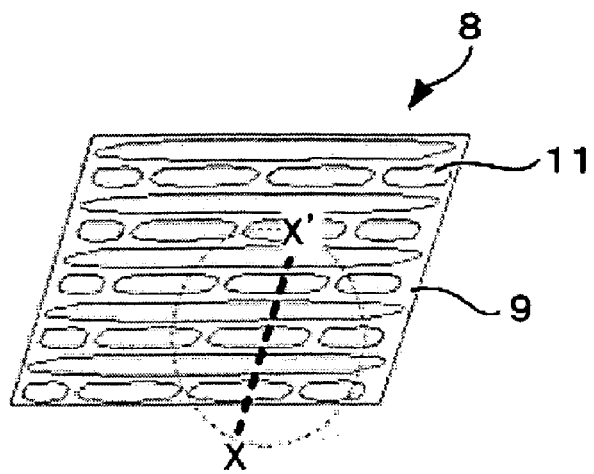
Figure 6B:
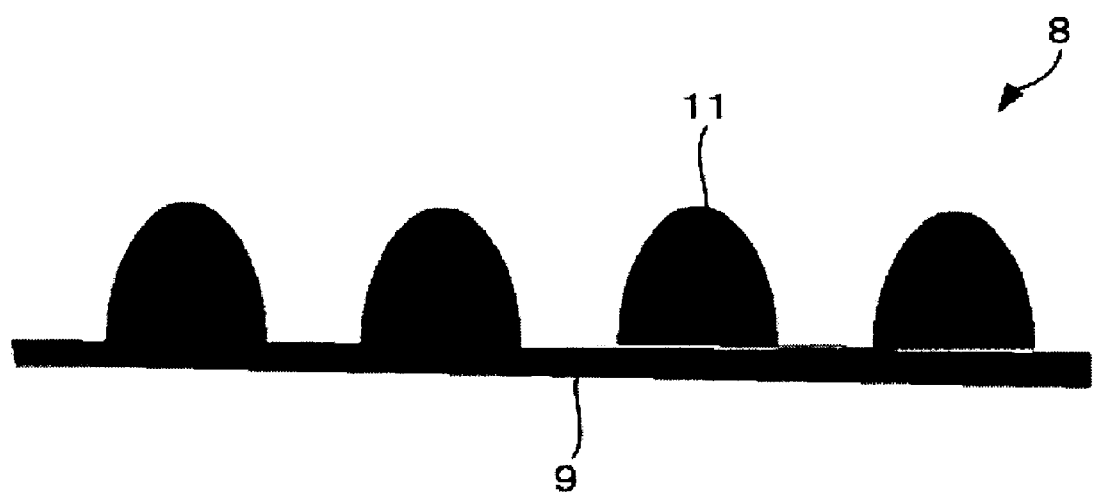
FIG. 6B is a cross-sectional view taken along X-X' line of FIG. 6A.

FIG. 6A shows a perspective view of a non-grounded electrode 8 having projections and depressions, obtained by providing a plurality of protrusions 11 on the surface of the metal plate 9, and FIG. 6B shows a cross-sectional view taken along X-X' line of FIG. 6A.

Figure 7A:
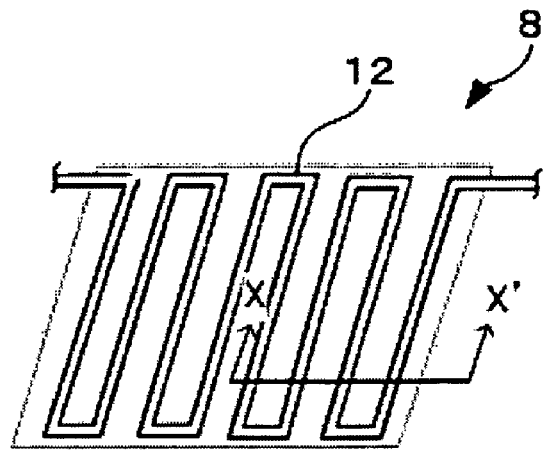
Figure 7B:
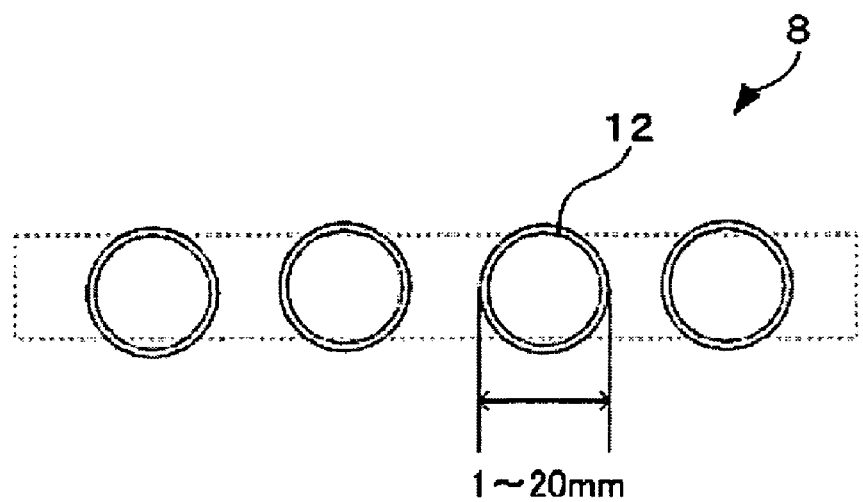
FIG. 7B is a cross-sectional view taken along X-X' line of FIG. 7A.

FIG. 7A shows a perspective view of a non-grounded electrode 8 formed by bending a long circular metal tube 12 several times, and FIG. 7B shows a cross-sectional view taken along X-X' line of FIG. 7A. The metal tube 12 preferably has a diameter of 1 mm to 20 mm, as described above.

Figure 8A:
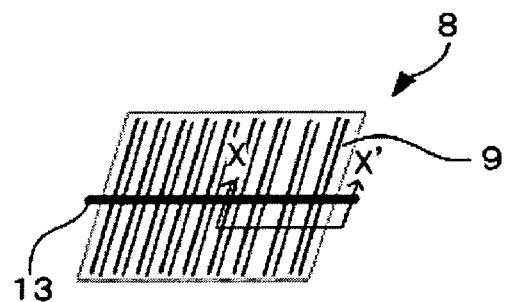
Figure 8B:
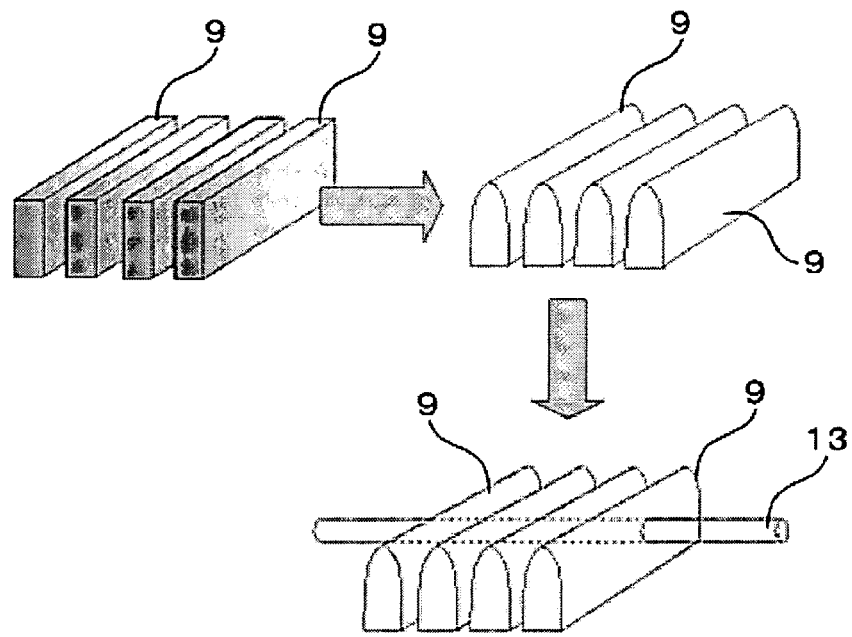
FIG. 8B is an example of a manufacturing process of the non-grounded electrode shown in FIG. 8A.
Figure 8C:
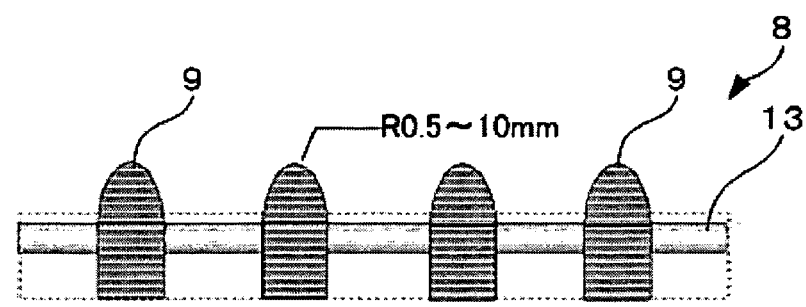
FIG. 8C is a cross-sectional view taken along X-X' line of FIG. 8A.

FIG. 8A shows a perspective view of a non-grounded electrode 8 formed by combining a plurality of rectangular metal plates 9 with a conductive wire 13, FIG. 8B is a conceptual diagram showing the manufacturing process thereof, and FIG. 8C shows a cross-sectional view taken along X-X' line of FIG. 8A. As shown in FIG. 8C, one side of each metal plate 9 is sharpened such that its cross section has a convex shape, and thereafter, these metal plates 9 are arranged in parallel and connected together with the conductive wire 13, so that all of them have the same potential. It is preferable that the curvature radius (R) of the tip of each metal plate 9 be 0.5 mm to 10 mm.

Figure 9A:
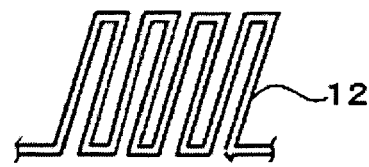
FIG. 9A is a perspective view of an example of a non-grounded electrode used for the ink fixing apparatus of the present invention or the like, showing a bent metal pipe.
Figure 9B:
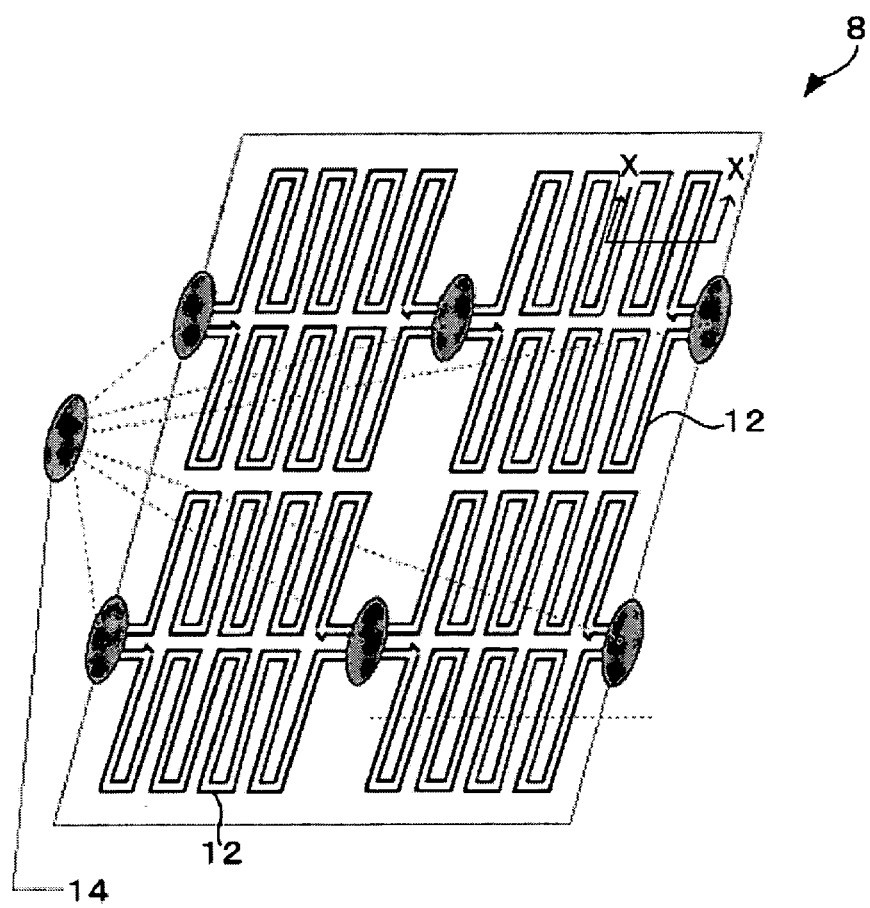
FIG. 9B is a perspective view of a completed non-grounded electrode.
Figure 9C:
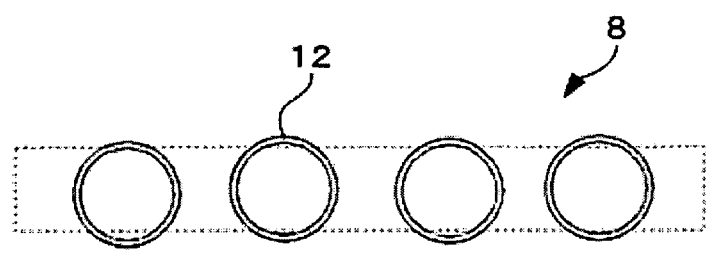
FIG. 9C is a cross-sectional view taken along X-X' line of FIG. 9B.

FIG. 9B shows a non-grounded electrode 8 formed by combining together a plurality of long circular metal pipes 12, each being bent several times. As a method of forming this non-grounded electrode 8, long metal pipes 12 are first bent several times as shown in FIG. 9A. Subsequently, as shown in FIG. 9B, the metal pipes 12 that have been bent are combined together with interconnections 14, so that all of them have the same potential. FIG. 9C shows a cross-sectional view of the non-grounded electrode 8.

Figure 10A:
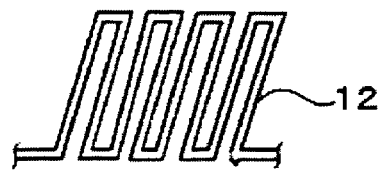
FIG. 10A is a perspective view of an example of a non-grounded electrode used for the ink fixing apparatus of the present invention or the like, showing a bent metal pipe.
Figure 10B:
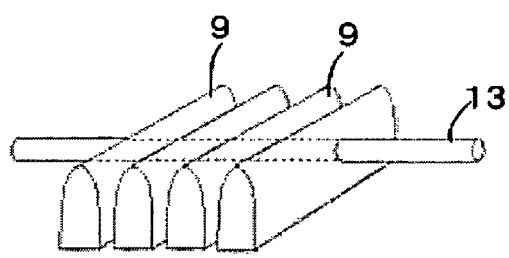
FIG. 10B is a perspective view of metal plates connected together with a conductive wire.
Figure 10C:
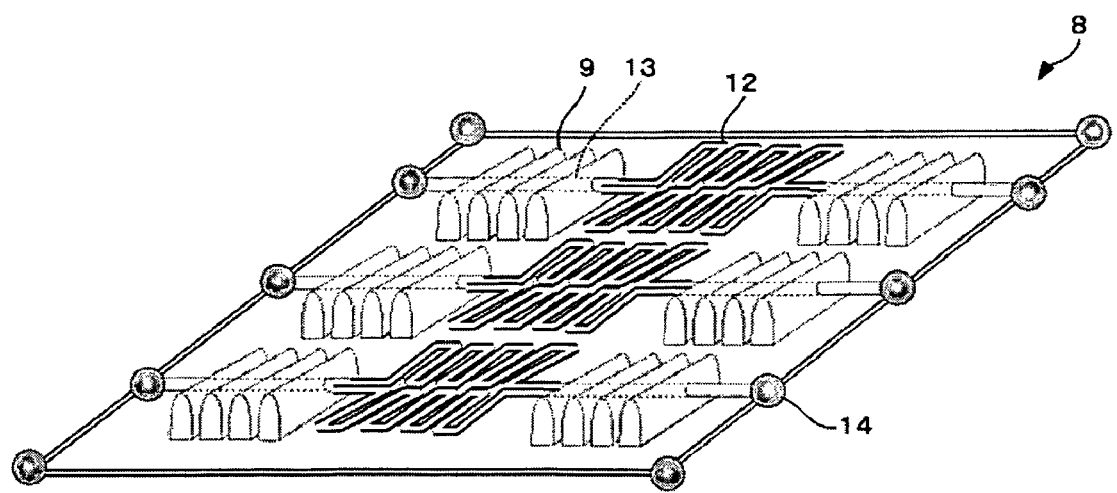
FIG. 10C is a perspective view of a completed non-grounded electrode layout.

FIG. 10A shows a long, circular metal pipe 12 that has been bent several times, FIG. 10B shows a set of rectangular metal plates 9 connected together with a conductive wire 13, one side of each metal plate 9 being sharpened such that its cross section has a convex shape, and FIG. 10C shows a non-grounded electrode 8 in which the metal pipe 12 and the set of rectangular metal plates 9 are connected together with interconnections 14, so that all of them have the same potential.

Studies show that the use of an electrode that is long in the direction in which a base material (paper sheet) is transferred and/or the use of a plurality, of electrodes is very important to achieve reduction in power cost.

Only a certain level of discharge is required to achieve fixing of ink to a base material (paper sheet), though depending on the type of print ink to be used). When an excessive level of discharge is used, it only leads to power consumption for allowing unnecessary current to flow between electrodes and/or damages the base material (paper sheet); there are no effects for ink fixing performance. It is generally thought that discharge needs to be allowed to take place extensively and uniformly, without exceeding a certain level.

Various studies show that there is a limitation for inducing a discharge from an electrode with a certain area, which the discharge can contribute to the ink fixing performance. An excessive level of discharge creates an unnecessary current flow and/or damages a base material (paper sheet), i.e., decomposes or burns the base material by heat.

A maximum electrical power to be supplied per unit area (1 $cm^2$) of a metal or conductor other than non-discharging portions of a non-grounded electrode is about 7W; therefore, no discharge can be obtained that can contribute to the ink fixing performance even when an electrical power is supplied at a level greater than 7W.

A further optimization of electrical power to be supplied involves adjustments of the ingredients of print ink, the feed rate of ink to the base material, the fixing speed, and the type of dielectric material.

The power source frequency needs to be set high for the purpose of increasing the quantity of discharge that contributes to the ink fixing performance. Power sources that can provide frequencies greater than 100 kHz at high voltage, however, are large in size and are not practically useful.

Even in a case of low frequency (50-60 kHz), the use of an electrode that is long in the direction in which a base material (paper sheet) is transferred and/or the use of a plurality of electrodes can induce more discharges that can contribute to the ink fixing performance. The use of a belt member is most suitable for transferring a base material (paper sheet) for a long distance between the electrodes at a high speed. A transferring unit using this belt member (hereinafter referred to as "belt transferring" in some cases) will be described in detail later.

—Print Ink—

The print ink used in the ink fixing method and ink fixing apparatus of the present invention is not particularly limited, as long as it contains a non-volatile organic compound bearing a carboxylic group and contains no photopolymerization initiators; materials for the print ink can be properly selected according to the color to be used.

Examples of the print ink include W/O emulsion inks, aqueous inks, and oil-based inks. In addition, examples of the non-volatile organic compound contained in these inks include hydrocarbons, fats and oils, waxes, higher fatty acids, resins, resin precursors, higher alcohols, esters, and glycerin. These ingredients are preferable in view of their low environmental impacts and their capability of preventing the generation of toxic substances. These ingredients may be used singly or in combination.

By applying active energy rays that have been generated as a result of atmospheric plasma discharge onto a base material for the fixation of such a print ink to the base material, the generation of toxic substances can be effectively prevented and, even when non-fixed ink has resulted, adverse influences on the human body and environment can be effectively avoided.

The aqueous inks contain water or a water-soluble organic solvent, dye, pigment, and dispersing agent, in addition to the foregoing ingredients, and further contain a surfactant, pH adjuster, viscosity adjuster, anti-rust agent, antiseptic agent, antioxidant, antireductant, evaporation promoter, penetrant, chelating agent, anti-drying agent, organic amine, etc on an as needed basis. The process for producing the aqueous inks is not particularly limited and can be properly selected from those known in the art; for example, the aqueous inks can be produced by dispersing the foregoing ingredients in an organic solvent or water and by, where appropriate, emulsifying them.

The oil-based inks contain an organic solvent or oil, dye, pigment, and dispersing agent, in addition to the foregoing ingredients, and further contain a surfactant, viscosity adjuster, antibacterial agent, lubricant, high-molecular dispersing agent, plasticizer, antistatic agent, antifoaming agent, antioxidant, ultraviolet absorber, etc on an as-needed basis. The process for producing the oil-based is not particularly limited and can be properly selected from those known in the art; for example, the oil-based inks can be produced by dispersing the foregoing ingredients in an organic solvent or oil and by, where appropriate, emulsifying them.

The W/O emulsion inks consist of an oil phase and an aqueous phase. The oil phase contains an organic pigment, colored pigment other than white one, extender pigment, dispersing agent, antioxidant, emulsifying agent, gelling agent, and additional ingredient(s), in addition to ingredients selected from the foregoing resins and the like. The aqueous phase contains an organic white pigment, water, water-soluble high-molecular compound, antibacterial agent, anti-evaporating agent or antifreezing agent for water, electrolyte, O/W emulsion, pH adjuster, and additional ingredient(s). The process for producing the W/O emulsion inks is not particularly limited and can be properly selected from those known in the art; for example, the W/O emulsion inks can be produced in the following manner. Both an oil phase and an aqueous phase are first prepared separately in the usual manner, and the aqueous phase thus prepared is mixed with the oil phase, followed by emulsification using a known an emulsification device such as a dispersing mixer, a homomixer, or high-pressure homogenizer.

—Resins—

The resin is not particularly limited and can be properly selected from those known in the art according to the color to be used; examples include alkyd resins; rosin resins such as polymerized rosin, hydrogenated rosin, rosin esters, rosin polyester resins and hydrogenated rosin esters; rosin-modified resins such as rosin-modified alkyd resins, rosin-modified maleic acid resins and rosin-modified phenol resins; maleic acid resins; phenol resins; petroleum resins; rubber derivative resins such as cyclized rubbers; terpene resins; and polymerized castor oil. These may be used singly or in combination. Among them, alkyd resins are most preferable.

The content of the resin in the print ink is preferably 15% by mass to 65% by mass and, more preferably, 25% by mass to 45% by mass in view of costs and printability.

The weight-average molecular weight of the resin is preferably 8,000 to 160,000 and, more preferably, 30,000 to 80,000 in view of fixing property and printability.

If the weight-average molecular weight of the resin is too low and if the content of the resin is too low, it may result in poor fixing property. On the other hand, if the weight-average molecular weight of the resin is too high and if the content of the resin is too high, it results in increased ink viscosity, which may cause a problem such as ink leakage.

—Resin Precursors—

The resin precursors are not particularly limited and can be properly selected from monomers, oligomers, dispersion polymers, etc., depending on the color to be used.

The monomers are selected from a monofunctional imide acrylate (HHPI-A), bifunctional acrylates (NDDA, TEGDA, TCDDA, NPG.PO.DA, TPGDA, and A-BPE4), and multifunctional acrylates (TMPTA, PETA, THEIC-TA, DTMPTA, DPHA, and TMP.EO.TA) in view of handling safety.

Examples of the oligomers include polyester acrylates, urethane acrylates, and epoxy acrylates.

Examples of the dispersion polymers include styrene acrylic polymer (specific commercial products are: JONCRYL 63, JONCRYL 61J, JONCRYL HPD71, JONCRYL HPD96, produced by Johnson Polymer Corporation), sodium polyacrylate (specific commercial products are: AQUALIC DL series, produced by NIPPON SHOKUBAI CO., LTD.), and acrylic acid/meleic acid copolymer salts (specific commercial products are: AQUALIC TL series, produced by NIPPON SHOKUBAI CO., LTD.).

The content of the resin precursor in the print ink is preferably 15% by mass to 65% by mass and, more preferably, 20% by mass to 45% by mass.

—Fats and Oils—

The fats and oils are glycerin esters of fatty acids, and can be properly selected from those known in the art depending on the intended purpose; examples include animal fats and oils, vegetable fats and oils, and refined petroleum oils and fats.

Examples of the vegetable fats and oils include avocado oil, almond oil, argan oil, olive oil, carrot oil, cucumber oil, kukui nuts oil (candle nuts oil), grape seed oil (grape oil), sesame oil, wheat germ oil, rice germ oil (oryza oil), rice bran oil (rice oil), cone oil, safflower oil, shea butter (shea fat), basil oil, soybean oil, tea oil (tee seed oil), evening primrose oil, camellia japonica seed oil, cone germ oil, canola oil, persic oil (apricot kernel oil, peach kernel oil), coix seed oil, palm oil, palm kernel oil, castor oil, hydrogenated castor oil (caster wax), sunflower oil, hazelnut oil, poppy oil, borage oil, macadamianuts oil, meadowfoam oil, cotton seed oil, wood wax, coconut oil, linseed oil, and rosehip oil.

Examples of the animal fats and oils include orange roughy oil, beef fat, turtle oil (green turtle oil), mink oil, egg oil, powder egg oil (hydrogenated egg oil), and horse oil. Examples of the refined petroleum oils and fats include mineral oils and synthesized oils.

These may be used singly or in combination.

The content of the fat and oil in the print ink is preferably 15% by mass to 65% by mass and, more preferably, 20% by mass to 45% by mass.

—Waxes—

The waxes are fatty acid esters of higher alcohols, and can be properly selected from those known in the art depending on the intended purpose; examples include carnauba wax, whale wax, shellac, jojoba oil, bee wax, white wax, montan wax, lanolin, lanolin derivatives, reduced lanolin, hard lanolin, purified lanolin, and hardened oil.

These may be used singly or in combination.

The content of the wax in the print ink is preferably 15% by mass to 65% by mass and, more preferably, 20% by mass to 45% by mass.

—Hydrocarbons—

The hydrocarbons are compounds consisting of carbon and hydrogen atoms, and can be properly selected from those known in the art depending on the intended purpose; examples include α-olefin oligomers, α-methylnaphthalene, β-methylanthracene, n-octadecylbenzene, di-2-ethylhexylsebacate, dicyclohexyl, diphenylmethane, squalane, vegetable squalane, CD squalane, ceresin (earth wax), tetraisobuthylene, tetralin, decalin, trimethylolpropane ester, m-bis(m-phenoxyphenoxy)benzene, paraffin hydrocarbons (solid paraffins), hydropolyisobutylene, n-hexane, n-hexadecylbenzene, n-decane, o-xylene, 1,1-diphenylhexadecane, naphthalene, naphthene hydrocarbons, aromatic hydrocarbons, pristane, polyisobutylene, polyethylene powder, polyethylene glycol, polypropylene glycol, microcrystalline wax, liquid paraffins, and petrolatum.

These may be used singly or in combination.

The content of the hydrocarbon in the print ink is preferably 15% by mass to 65% by mass and, more preferably, 20% by mass to 45% by mass.

—Higher Fatty Acids—

The higher fatty acids are constituents of naturally occurring fats, oils, and waxes, and are compounds represented by the general formula RCOOH. The higher fatty acids are not particularly limited and can be properly selected from those known in the art depending on the intended purpose; examples include arachidonic acid, isostearic acid, undecylenic acid, oleic acid, stearic acid, palmitic acid, behenic acid, myristic acid, lauric acid, lanolin fatty acids, hard lanolin fatty acids, soft lanolin fatty acids, linoleic acid, and linolenic acid.

These may be used singly or in combination.

The content of the higher fatty acid in the print ink is preferably 15% by mass to 65% by mass and, more preferably, 20% by mass to 45% by mass.

—Higher Alcohols—

The higher alcohols are monohydric alcohols having 6 or more carbon atoms and can be properly selected from those known in the art depending on the intended purpose; examples include isostearyl alcohol, oleyl alcohol, octyldodecanol, chimyl alcohol (glyceryl monocetyl ether), cholesterol (cholesterin), sitosterol (sitosterin), stearyl alcohol, cetanol (cethyl alcohol, palmityl alcohol), cetostearyl alcohol, selatyl alcohol (monooleyl glyceryl ether), decyltetradecanol, batyl alcohol (monostearyl glyceryl ether), phytosterol (phytosterin), hexyldecanol, behenyl alcohol, lauryl alcohol, lanolin alcohol, and hydrogenated lanolin alcohol.

These may be used singly or in combination.

The content of the higher alcohol in the print ink is preferably 15% by mass to 65% by mass and, more preferably, 20% by mass to 45% by mass.

—Esters—

The esters are organic compounds that result from reaction between acids and alcohols, with elimination of water. Examples of such acids include fatty acids, polybasic acids, and hydroxylic acid, and examples such alcohols include lower alcohols, higher alcohols, and polyalcohols.

The esters are not particularly limited and can be properly selected from those known in the art depending on the intended purpose; examples include acetylated lanolin (lanolin acetate), isocetyl isostearate (hexyldecyl isostearate), cholesteryl isostearate, octyldodecyl erucate (EOD), cetyl octanoate (cetyl 2-ethylhexanoate), cetostearyl octanoate (stearyl 2-ethylhexanoate, cetostearyl isooctanoate), octyldodexyl oleate, decyl oleate, hexyldecyl dimethyloctanoate, isocetyl stearate (hexyldecyl stearate), cholesteryl stearate, butyl stearate, cholesteryl long chain-α-hydroxy fatty acid esters, (GL cholesteryl), glycerin trimyristate, cetyl lactate, myristyl lactate, isopropyl palmitate (IPP), cholesterol hydroxystearate, isotridecyl myristate (MITD), isopropyl myristate (IPM), octyldodecyl myristate (MOD), myristyl myristate, hexyl laurate, isopropyl lanolate, cholestyl lanolate, and diisostearyl malate.

These may be used singly or in combination.

The content of the ester in the print ink is preferably 15% by mass to 65% by mass and, more preferably, 20% by mass to 45% by mass.

As described above, since the ink fixing apparatus of the present invention utilizes active energy rays generated as a result of a discharge between electrodes, there is no need to provide such conventional components as an air-cooling fan and/or a heat exhausting duct for cooling heat from a UV lamp, a shutter mechanism for opening and closing the fixing apparatus, a shielding plate for preventing leakage of UV light to the outside of the fixing apparatus, etc. Thus, it is made possible to reduce apparatus size and thus to minimize the installation area.

In addition, even inks with poor light transmittance can be cured regardless of their particular characteristics, and therefore, ink fixing can be achieved only by applying a constant, low-level energy for ink curing. For this reason, the fixing apparatus of the present invention is excellent in energy efficiency and can reduce power source costs and maintenance costs.

Moreover, since curing reactions are never inhibited by oxygen in the air, there is no need to provide a device for preventing the reaction inhibition, enabling miniaturization and simplification of the ink fixing apparatus, as well as improvement of processing efficiency. Meanwhile, printing that involves the use of oil-based inks generally takes time because they are fixed to a base material by oxidization of their oil ingredients by oxygen of the atmosphere. For this reason, it is likely that feathering and/or offset occurs, making printing operations difficult. However, by using the foregoing active energy rays for ink fixing as demonstrated in the present invention, solidification of oil ingredients is facilitated, thereby resulting in rapid, excellent ink fixing operations.

In contrast to ultraviolet ray, active energy rays generated as a result of a discharge between electrodes produce no non-exposed portions that are created due to refraction, diffusion and reflection of light, whereby the generation of non-fixed ink can be prevented and negative impacts on the human body and environment can be eliminated.

<Ink Supplying Unit>

The ink supplying unit is one that supplies print ink to a surface of a base material.

After supplying print ink to a surface of a base material by means of the ink supplying unit, the ink fixing unit may cause the energy ray-providing part to apply active energy rays to the print ink for the fixing of the print ink to the base material. With this configuration, the print ink can be firmly fixed to the base material.

Alternatively, after applying active energy rays to a printed base material, which may have non-fixed ink, by means of the ink fixing unit for the fixing of the non-fixed ink, the ink supplying unit may perform another printing operation. With this configuration, it is possible to prevent mixing of the ink of the first printing operation with that of the second one, allowing printing that provides sharp images without feathering.

The ink supplying unit is not particularly limited and can be properly selected from those known in the art; examples include stencil printing units, planographic printing units, letterpress printing units, intaglio printing units, and ink-jet printing units. Ink supplying units that are ink-jet printing type are smaller in size than offset printing units and stencil printing units.

<Discharging Unit>

The discharging unit removes by-products generated as a result of application of active energy rays by means of the energy ray-providing part. Examples of such by-products include gases generated from a discharge between electrodes, gases from electron beams, light and a base material, and gases from reactions associated with ink fixing. As the discharging unit, a gas removing unit such as a gas adsorbing unit, a gas decomposing unit, or a gas exhausting unit can be used. Because the present invention can realize low-energy ink fixing that causes small amounts of toxic substances, the fixing apparatus of the present invention can be made simple and compact compared to a conventional fixing apparatus that requires an air-cooling fan, a heat exhausting duct, a shutter mechanism, a shielding plate for preventing leakage of UV light, etc.

Examples of the foregoing gases or by-products include ozone gas, NOx gases, and volatile organic compound (VOC) gases. These gases may affect, more or less, the human body and environment.

The gas discharging unit is not particularly limited and can be properly selected from those known in the art depending on the intended purpose. For example, an air duct (e.g., an exhaust duct, an exhaust fan, or an outlet) may be provided at a position facing the electrodes. This allows the atmosphere around the electrodes to escape for the removal of such gases.

As the gas adsorbing unit, a filter made of activated carbon fiber, zeolite, or photocatalyst may be provided at any position in the air duct for the adsorption of the by-product gases. In this way toxic gases can be removed more efficiently to reduce negative impacts on the human body as much as possible. For such a filter, activated carbon fiber, zeolite, photocatalyst, etc., may be used singly or in combination.

In addition, NOx gases can be efficiently removed by the gas adsorbing unit that uses combination of activated carbon fiber, zeolite and photocatalyst, thereby providing excellent NOx gas removing efficiency. Moreover, the adsorbed NOx gases can be decomposed into $NO_3^-$ ions by photocatalytic effects. Thus, they can be efficiently removed.

The gas decomposing unit can, for example, cause ozone gas to come in contact with activated carbon fiber, converting it to carbon dioxide efficiently. Accordingly, ozone gas can be efficiently removed by arranging activated carbon fiber as an air duct filter in a printer (ink fixing apparatus).

In addition, a filter provided with titanium oxide-immobilized activated carbon fiber can be used as a means for adsorbing and decomposing VOC gases, whereby VOC gases can be efficiently adsorbed to the filter. Subsequently, the filter is directly irradiated with sun light or ultraviolet light using an ultraviolet lamp (sterilizing lamp) to decompose the VOC gas adsorbed to the activated carbon fiber into carbon dioxide with a help of the titanium oxide photocatalyst. Thus, it is possible to realize efficient removal of VOC gases and reuse of activated carbon fiber. The combined use of zeolite and titanium oxide photocatalyst is also effective as a means for adsorbing and decomposing VOC gases.

These gas adsorbing and gas decomposing units can be readily realized even in an office where a special ventilation system (forced exhaust system) is not installed, provided that normal ventilation is possible.

It is effective to use a simple duct as the gas discharging unit to discharge gas generated in the apparatus to the outside. This configuration is suitable to a case where an operator is sensitive to by-products even when the foregoing units have been utilized for the removal of such by-products.

For safety reasons, it is also effective to make an environment that generates no ozone gas and NOx gases. For example, a hollow fiber membrane made of silicone rubber or polyimide is provided upstream of the air duct close to the discharge electrodes for the blocking of oxygen, allowing the atmosphere around the electrode filled only with nitrogen. In this way active energy rays can be prevented from contacting oxygen, efficiently avoiding the generation of ozone gas and/or NOx gases.

<Inputting Unit>

The inputting unit is a means for introducing a base material into an ink fixing apparatus, and can be properly selected from those known in the art depending on the intended purpose; examples include a paper feed tray, a paper feed bank (box), a roll paper set mechanism, a roll paper cut mechanism, a base material supply table, a base material supply tray, and a base material supply shelf.

<Outputting Unit>

The outputting unit is a means for ejecting a base material to which ink has been fixed by means of the ink fixing apparatus, and can be properly selected from those known in the art depending on the intended purpose; examples include a storage tray, a storage bank (box), a storage shelf, a winding mechanism, and a folding mechanism.

<Transferring Unit>

The transferring unit is a means for transferring a base material from the inputting unit to the outputting unit in a fixing apparatus, whereby the base material is transferred to the ink fixing unit for ink fixing.

The transferring unit is not particularly limited as long as a base material can be transferred to the ink fixing unit, and can be properly selected depending on the intended purpose. For example, a transferring unit is preferable that at least performs transferring by using a belt member with a thickness of 0.03 mm to 5.0 mm and a relative permittivity of 10 or less for base material transfer.

By using such a belt member with a thickness of 0.03 mm to 5.0 mm and a relative permittivity of 10 or less, more active energy rays can be imparted upon creation of an atmospheric plasma discharge.

The constituent material of the belt member preferably contains at least one material selected from chloroprene rubber, nitrile rubber, butyl rubber, ethylenepropylenedien rubber, chlorosulfonated polyethylene, acrylic rubber, silicone rubber, fluorine rubber, natural rubber, styrene-butadiene rubber, ethylene tetrafluoride, polyamides, and polyimides. These materials may be used singly or in combination. Note that their permittivities have already been described in the above description for dielectric materials covering a grounded electrode.

The relative permittivity of the belt member can be set to 10 or less by using these materials.

To facilitate separation of the base material from the surface of the belt member upon termination of transfer, it is preferable to provide a neutralizing unit for removing electrical charges from the base material. Suitable examples of such a neutralizing unit include a neutralizing brush and a neutralizing ionizer.

The speed at which a base material is transferred by means of the transferring unit is preferably 50 to 200 cm/sec and, more preferably, 100 to 200 cm/sec. If the transfer speed is less than 50 cm/sec, it may result in poor productivity, or low throughput. If the transfer speed is greater than 200 cm/sec, ink fixing property may be reduced because the provision of active energy rays generated as a result of atmospheric plasma discharge may be insufficiently.

In view of the necessity that a number of printed flat sheets need to be processed continuously at a high rate while achieving ink fixing by atmospheric plasma discharge between electrodes, belt transferring is most effective and requires minimum cost.

While discharge cures print inks, it provides charges to a base material. When the base material is transferred using a belt member, the base material is attached to the belt member on its entire surface.

This state is highly advantageous to allow the base material (paper sheet) to pass through a narrow space at a high speed, which is created between the plasma discharge electrodes.

Various studies show that ink fixing effects can be enhanced by increasing the electrical field intensity between the plasma discharge electrodes. To achieve this, the distance between the electrodes needs to be reduced.

It is, however, difficult to allow a base material (paper sheet) to pass through such a narrow space with reliability without pressing the base material against the belt member, causing the base material to collide with the electrodes constituting the space. As a result, so-called "paper jam" occurs.

Roller transferring that involves the use of rollers has been generally used as a means for transferring the base material (paper sheet). This roller transferring strategy, however, often entails slight curling of a base material (e.g., a flat paper sheet) for high-speed transfer. The adoption of the roller transferring strategy for the ink fixing of the present invention, where a discharge phenomenon is used, requires provision of a clearance (space) between the electrodes for clear passing of the curled portion of that base material. The increased distance between the electrodes as described above causes reduction in electrical field intensity when a constant high-voltage power source is used. For this reason, there is no choice but to reduce the base material transfer speed between the electrodes for sufficient provision of active energy rays.

Although it is not technically impossible to increase the output voltage of the high-voltage power source, miniaturization and cost reduction cannot be achieved not only for the power source, but also for the ink fixing apparatus. The belt transferring strategy is suitable to avoid these problems.

The additional advantages of the belt transferring strategy is that high-speed base material transfer can be realized even when long electrodes are employed and thus the distance between them is shortened, because the base material is entirely fixed to the belt surface. As a result, it is possible to readily obtain excellent ink fixing effects by providing sufficient amounts of active energy rays to the base material.

As described above, since a base material can be smoothly transferred from one unit to another at a high speed with the belt transferring strategy without causing sheets to be jammed in a long, narrow discharge space formed between electrodes, it is possible to obtain excellent ink fixing effects. Thus, this is the best strategy for performing a high-speed ink fixing operation for a number of printed matters.

Long electrodes can be used even in the event that base materials are continuously printed out followed by ink fixing operations. This means that the ink fixing time can be prolonged even when the base material is moved at a high speed. The influence of the prolong time itself on the high-speed processing or tact time in the ink fixing apparatus and/or printer is ignorable. Moreover, since the occurrence of paper jam or the like can be prevented, more efficient processing is possible.

<Operation Controlling Unit>

The operation controlling unit controls the operation of the ink fixing unit. For example, it detects the presence of non-fixed ink on a base material, and causes the ink fixing unit to operate only when the non-fixed ink has been detected. In this way unnecessary energy consumption can be avoided, leading to increased energy efficiency and reduced maintenance cost. Moreover, this operation controlling unit can achieve efficient provision of active energy rays for relatively small non-fixed ink targets (e.g., marks and lines), efficiently curing them with reliability.

The operation controlling unit is not particularly limited and can be properly selected from those known in the art depending on the intended purpose. For example, an operation controlling unit may be used that controls the operational timing of the ink fixing unit by detecting the presence of non-fixed ink using at least one of an electrical non-contact sensor, a magnetic non-contact sensor, and an optical non-contact sensor.

The electrical non-contact sensor uses a capacitance sensor or the like to determine the capacitance of a base material and, in a case where only the presence of the base material has been detected and where the presence of non-fixed ink (hereinafter referred to as "deemed non-fixed ink" in some cases) has been detected, detects the presence of non-fixed ink on the base material on the basis of the difference in capacitance between the base material and ink material, which the difference caused by their difference in permittivity.

The magnetic non-contact sensor senses lines of magnetic force from magnetic material contained in the ink in trace amounts, and detects the presence of non-fixed ink on a base material by converting the changes in magnetic force to the change in electrical resistance.

The optical non-contact sensor first determines the difference in light reflectivity (light absorbance) between print ink and paper, and if the found value is smaller than the threshold value (i.e., the lower limit of the light reflectivity or light absorbance for paper with no print ink), it determines that non-fixed ink is present on the surface of the base material.

If non-fixed ink is uniformly distributed over the entire surface of a base material, for the controlling of operational timing of the ink fixing unit, the operation controlling unit preferably detects the point at which the base material has started to pass though the ink fixing unit and the point at which the base material has passed through the ink fixing unit by use of a combination selected from a combination of a mechanical unit with one of electrical and magnetic contacts and a combination of a mechanical unit with an optical sensor, rather than detecting the presence of non-fixed ink itself. If non-fixed ink is to be detected only at some portions of the base material, a complicated and highly precise detection mechanism is required. In this embodiment, however, it is possible to simplify the operation controlling unit because it is only necessary to detect the start and end points of base material transfer.

In the detection mechanism, there is provided a mechanical unit consisting of a cam mechanism that is directly to or indirectly connected to a driving member for transferring or introducing a base material (e.g., drive member or the like) via a mechanical mechanism, the driving member placed in a path through which the base material is transferred. The mechanical unit detects the start point of base material transfer by means of an electrical contact or an optical sensor that responses to the movement of the cam mechanism. In this way the detection mechanism determines the presence and absence of the base material on the basis of the start of the movement of the cam mechanism and the termination of its movement, respectively. In addition, it is determined that the presence of the base material corresponds to "the presence of deemed non-fixed ink," and the absence of the base material to "the absence of deemed non-fixed ink." In this way the ink fixing unit is operated. Alternatively, a mechanical switch is placed in the path where the base material is transferred, and an electrical contact or optical sensor connected to the mechanical switch determines the presence of the base material on the basis of the fact whether or not the base material is in contact with the path and/or whether or not the pressure acting on the sensor has been changed. In addition, it is determined that the presence of the base material corresponds to "the presence of deemed non-fixed ink," and the absence of the base material to "the absence of deemed non-fixed ink." In this way the ink fixing unit is operated.

By causing the active energy-providing part to operate at the start point of base material transfer and by stopping the operation of the active energy-providing part at the end point of base material transfer, active energy rays can be applied all over the base material and no active energy rays are applied to portions other than the base material, thereby avoiding unnecessary energy consumption and enabling ink fixing with excellent energy efficiency.

As has been described above, the ink fixing apparatus of the present invention is excellent in energy efficiency, operability and ink-fixing property and is a highly human- and environment-friendly, simple and compact apparatus. Thus, it can be suitably applied to the printer of the present invention, general printers, coaters, etc.

The ink fixing apparatus of the present invention will be described in detail with reference to the drawings.

First Embodiment

FIG. 1 is a conceptual diagram of an ink fixing apparatus according to a first embodiment of the present invention. The ink fixing apparatus according to the first embodiment includes an ink supplying unit and an ink fixing unit, constituting an apparatus provided with a printing function. An ink fixing apparatus 100 shown in FIG. 1 includes an inputting unit 1, an outputting unit 2, for inputting and outputting a base material 6, and a transferring unit 3 (endless belt made of polyimide) for transferring the base material 6 from the inputting unit 1 to the outputting unit 2. An ink supplying unit 5 for supplying print ink to the base material 6 is arranged above the transferring unit 3. As an ink fixing unit for fixing the print ink to the base material 6 that has been supplied by means of the ink supplying unit 5, an energy ray-providing part 4 for providing active energy rays from a discharge generated between electrode is arranged downstream of the transferring unit 3. The energy ray-providing part 4 consists of a grounded electrode 7 and a non-grounded electrode 8, which are placed on opposite sides of the transferring unit 3 or an endless belt member, with the distance from the electrode 8 to the endless belt member being 0.5 mm. Arrows in FIG. 1 represent the direction in which the base material 6 is transferred.

In the first embodiment a base material that has been introduced by means of the inputting unit 1 is transferred to the ink supplying unit 5 by means of the transferring unit 3, where ink is supplied to the surface of the base material. Thereafter, active energy rays are applied to the ink on the base material by means of the energy ray-providing part 4 to fix the ink thereto with reliability, and the base material 6 is outputted by means of the outputting unit 2.

The ink fixing apparatus according to the first embodiment with such a configuration may be further provided with a discharging unit for discharging by-products, and an operation controlling unit for controlling the ink fixing unit.

Moreover, the ink fixing apparatus according to the first embodiment is suitable for fixing and drying of W/O emulsion inks, aqueous inks, and oil-based inks. The ink fixing apparatus according to the first embodiment is suitable for color printing that is capable of recoating.

Second Embodiment

Figure 2:
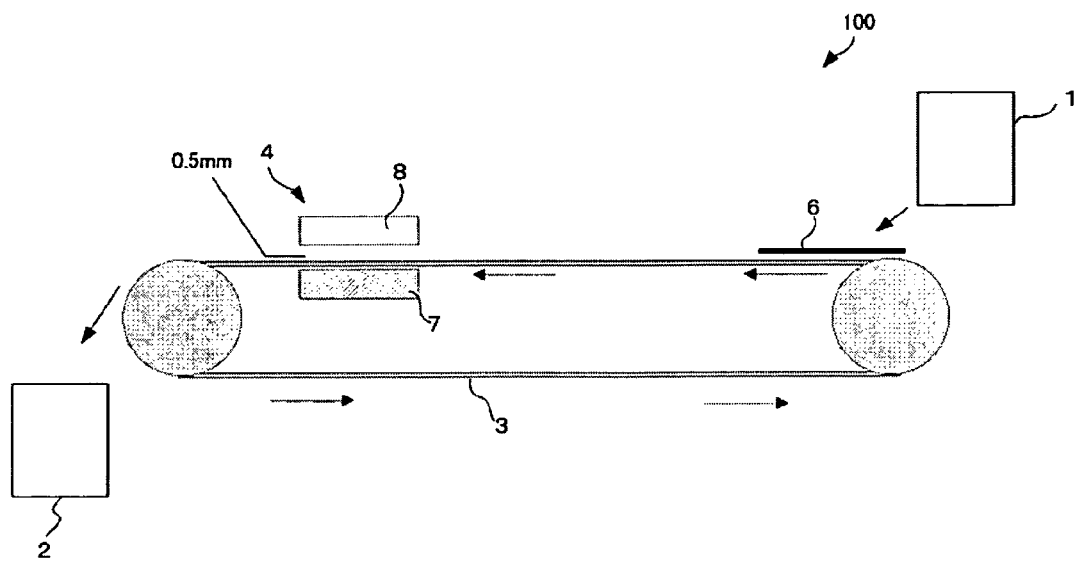
FIG. 2 is a schematic view showing an example of the ink fixing apparatus of the present invention.

FIG. 2 is a conceptual diagram of an ink fixing apparatus according to a second embodiment of the present invention. The ink fixing apparatus according to the second embodiment is one that receives a base material that has previously been supplied with ink, and performs only an ink fixing operation for the base material 6; therefore, no ink supplying unit is provided. An ink fixing apparatus 100 shown in FIG. 2 includes an inputting unit 1, an outputting unit 2, for inputting and outputting the base material 6, and a transferring unit 3 (endless belt made of polyimide) for transferring the base material 6 from the inputting unit 1 to the outputting unit 2. An ink supplying unit 5 for supplying print ink to the base material 6 is arranged above the transferring unit 3. As an ink fixing unit for fixing the print ink to the base material 6 that has been supplied by means of the ink supplying unit 5, an energy ray-providing part 4 for providing active energy rays generated as a result of electrode-to-electrode discharge is arranged downstream of the transferring unit 3. The energy ray-providing part 4 consists of a grounded electrode 7 and a non-grounded electrode 8, which are placed on opposite sides the transferring unit 3 or an endless belt member, with the distance from the electrode 8 to the endless belt member being 0.5 mm. Arrows in FIG. 2 represent the direction in which the base material 6 is transferred.

In the second embodiment the base material 6 with which ink has previously been supplied is introduced from the inputting unit 1, transferred to the energy ray-providing part 4 by means of the transferring unit 3, and active energy rays are applied to the ink on the base material 6 by means of the energy ray-providing part 4 for to fix the ink thereto with reliability. Thereafter the base material 6 is outputted by means of the outputting unit 2.

The ink fixing apparatus according to the second embodiment may also be provided with a discharging unit for discharging by-products, and an operation controlling unit for controlling the ink fixing unit.

Moreover, the ink fixing apparatus according to the second embodiment is suitable for fixing and drying of W/O emulsion inks, aqueous inks, and oil-based inks. Furthermore, the ink fixing apparatus according to the second embodiment can be suitably used for drying and fixing of inks used in art objects such as oil paintings, in addition to drying and fixing of inks used in printed matters. The ink fixing apparatus according to the second embodiment are also suitable for printing on food packages by virtue of sterilization and drying effects brought about by active energy rays.

Third Embodiment

Figure 3:
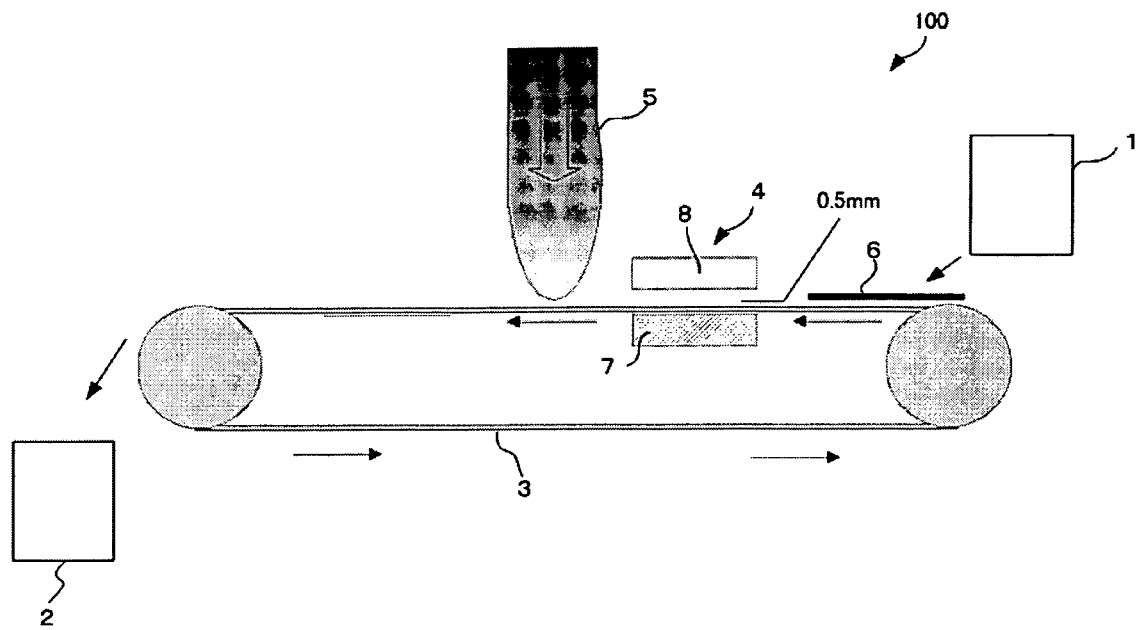
FIG. 3 is a schematic view showing an example of the ink fixing apparatus or printer of the present invention.

FIG. 3 is a conceptual diagram of an ink fixing apparatus according to a third embodiment of the present invention. An ink fixing apparatus 100 according to the third embodiment of the present invention includes an inputting unit 1, an outputting unit 2, for inputting and outputting a base material 6, and a transferring unit 3 (endless belt made of polyimide), and an ink supplying unit 5 is arranged above the transferring unit 3. As an ink fixing unit an energy ray-providing part 4 consisting of a grounded electrode 7 and a non-grounded electrode 8 is arranged upstream of the transferring unit 3. Arrows in FIG. 3 represent the direction in which the base material 6 is transferred.

In the third embodiment it is assumed that the base material 6 introduced from the inputting unit 1 is a base material that has already been printed out by another printer or the printer of this embodiment and has non-fixed ink on some portions thereof. The base material 6 having non-fixed ink is transferred from the inputting unit 1 to the energy ray-providing part 4 by means of the transferring unit 3, where active energy rays are applied to the surface of the base material 6 for the fixing of the non-fixed ink thereto. Thereafter, the base material 6 is transferred to the ink supplying unit 5 for supplying ink to the surface of the base material 6, followed by outputting by means of the outputting unit 2.

The ink fixing apparatus of the third embodiment may also be provided with a discharging unit for discharging by-products, and an operation controlling unit for controlling the ink fixing unit.

The ink fixing apparatus of the third embodiment is suitable for a case where two or more colors are to be printed on a base material that has already been printed out by a conventional printer that is not equipped with an ink fixing mechanism while avoiding mixing of colors.

More specifically, the ink fixing apparatus according to the third embodiment is suitable for the following application: A number of flyers or sales circulars are first printed out by a conventional printer at the home office (note in this case that print inks that contain a non-volatile organic compound bearing a carboxylic group but no photopolymerization initiators are used). Next, in their branch offices and local dealers around the country, the ink fixing apparatus according to the third embodiment of the present invention are used to print additional information concerning the branch offices, local dealers, local communities, etc., on the printed matters produced in the home office.

Fourth Embodiment

Figure 4:
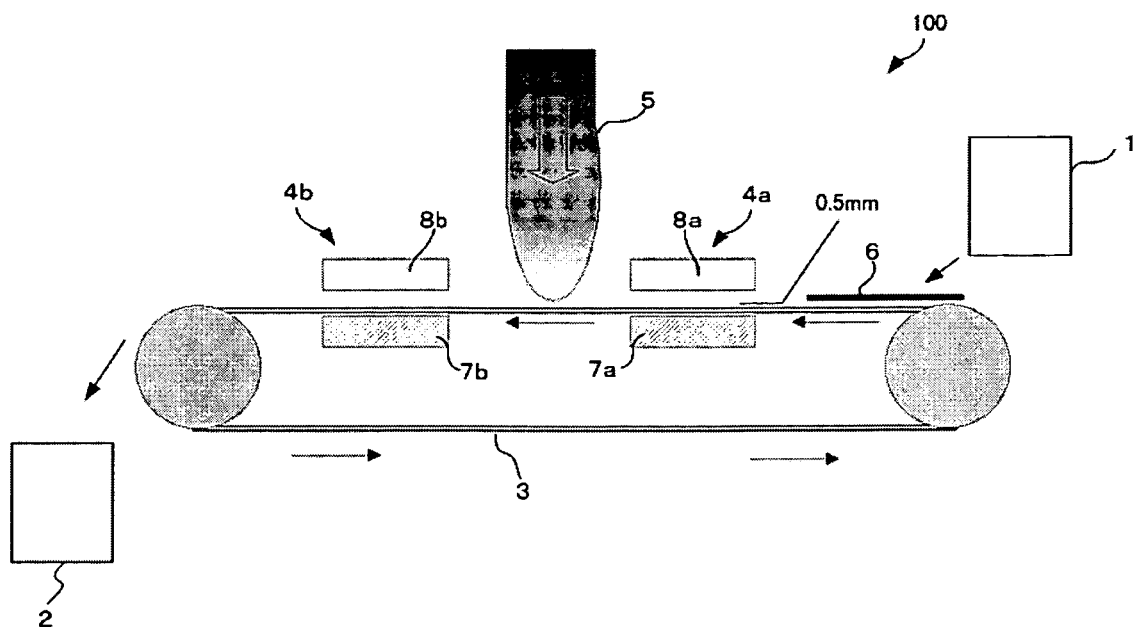
FIG. 4 is a schematic view showing an example of the ink fixing apparatus or printer of the present invention.

FIG. 4 is a conceptual diagram of an ink fixing apparatus according to a fourth embodiment of the present invention. An ink fixing apparatus 100 according to the fourth embodiment of the present invention includes an inputting unit 1, an outputting unit 2, for inputting and outputting a base material 6, and a transferring unit 3 (endless belt made of polyimide), and an ink supplying unit 5 is arranged above the transferring unit 3. As ink fixing units, energy ray-providing parts 4a and 4b are arranged on opposite sides of the ink supplying unit 5. Arrows in FIG. 4 represent the direction in which the base material 6 is transferred.

In the fourth embodiment it is assumed that the base material 6 inputted from the inputting unit 1 is a base material that has already been printed out by another printer or the printer of this embodiment and has non-fixed ink on some portions thereof. The base material 6 having non-fixed ink is transferred from the inputting unit 1 to the energy ray-providing part 4a by means of the transferring unit 3, where active energy rays are applied to the surface of the base material 6 for the fixing of the non-fixed ink thereto. Thereafter, the base material 6 is transferred to the ink supplying unit 5 for supplying ink to the surface of the base material 6, and then active energy rays are applied to the surface of the base material 6 by means of the energy ray-providing part 4b for ink fixing, followed by outputting by means of the outputting unit 2.

The ink fixing apparatus of the fourth embodiment may also be provided with a discharging unit for discharging by-products, and an operation controlling unit for controlling the operation of the ink fixing unit.

The ink fixing apparatus of the fourth embodiment is suitable for a case where two or more colors are to be printed on a base material that has already been printed out by a conventional printer that is not equipped with an ink fixing mechanism while avoiding mixing of colors.

More specifically, the ink fixing apparatus according to the fourth embodiment of the present invention is suitable for printing of pass tickets, securities, gift certificates, identification certificates, guarantee certificates, etc., that require high-speed printing and high quality compared to those printed by the printer of the third embodiment of the present invention.

(Printer)

The printer of the present invention includes at least the ink fixing apparatus of the present invention, and includes an ink supplying unit, an inputting unit, an outputting unit, a discharging unit for by-products, etc., on an as-needed basis.

Suitable examples of the embodiments of the printer of the present invention are those shown in FIGS. 1, 3 and 4, which have been identified in the description for the ink fixing apparatus.

Since the printer of the present invention includes the ink fixing apparatus of the present invention, it is a compact, simple apparatus that is excellent in energy efficiency, operability and ink fixing property, capable of providing human- and environment-friendly ink fixing performance and of providing high-quality images at low cost; therefore, it is suitably used for stencil printers, ink-jet printers, letterpress printers, offset printers, etc.

EXAMPLES

Hereinafter, Examples of the present invention will be described, which however shall not be construed as limiting the invention thereto.

—Preparation of W/O Emulsion Inks—

The colorants, oil ingredients, dispersing agents, resin, and emulsifying agent shown in Table 1 were mixed together and agitated using a high-speed dissolver, followed by dispersion using a bead mill (LMZ2, manufactured by Ashizawa Finetec, Co., Ltd.) to prepare oil phases.

Next, the colorants, water-soluble polymers, dispersing agent, antifreezing agent, and antiseptic agent shown in Table 1 were mixed together, and the resultant mixtures were dissolved in water to prepare aqueous phases.

Using an emulsifying machine (ET-3A, manufactured by Nikko Chemicals Co., Ltd.), the aqueous phase was slowly added to the oil phase with agitation. In this way W/O emulsion inks were prepared.

TABLE 1

| | | Ingredients | | Black ink | Blue ink | Red ink |
|---|---|---|---|---|---|---|
| Oil Phase | Colorant | Red | C.I Pigment RED 122 | — | — | 5.0 |
| | | Blue | C.I Pigment Blue 15:3 | — | 4.5 | — |
| | | Black | CB Black 7 | 4.0 | — | — |
| | Oil ingredient | Mineral oil | AF-6 Solvent | 5.0 | 4.5 | 5.0 |
| | | Vegetable oil | Soybean oil methylester | 7.0 | 9.0 | 7.0 |
| | | | Soybean oil | 5.5 | 3.5 | 5.5 |
| | Dispersing agent | | PLAIN ACT AL-M | 2.0 | 2.0 | 2.0 |
| | | | HARIPHENOL 173 (Molecular weight = 60,000) | 1.0 | 1.0 | 1.0 |
| | Resin | | Alkyd resin | 3.0 | 3.0 | 3.0 |
| | Emulsifying agent | | Sorbitan monooleate | 3.0 | 3.0 | 2.0 |
| | Total (mass %) | | | 30.5 | 30.5 | 30.5 |
| Aqueous phase | Water | | Ion-exchanged water | 59.5 | 59.5 | 59.5 |
| | Antifreezing agent | | Glycerin | 7.0 | 7.0 | 7.0 |
| | Electrolyte | | Magnesium sulfate heptahydrate | 2.0 | 2.0 | 2.0 |
| | Antiseptic agent | | Methyl p-oxybenzoate | 1.0 | 1.0 | 1.0 |
| | Total (nass %) | | | 69.5 | 69.5 | 69.5 |

Each of the W/O emulsion inks with ingredients shown in Table 1 contains a "soybean oil" as an oil ingredient. This oil is a vegetable oil and thus contains slight amounts of free fatty acids. Thus, it is speculated that the carboxylic groups in such fatty acids chemically change the W/O emulsion inks so as to be fixed to a base material, when they are subjected to an atmospheric plasma discharge by means of an ink fixing apparatus to be described later.

—Preparation of Aqueous Inks—

Aqueous ink-jet inks were prepared in a manner described below. Note that the aqueous inks of four different colors—cyan, magenta, yellow, and black—constitute one ink set.

Using a bead mill (Minizeter MZ03, manufactured by Ashizawa Finetec, Co., Ltd.), pigments, dispersing agents and additive (to be added where necessary), shown in Table 2, were mixed with water to prepare pigment dispersions.

The pigment dispersions thus prepared were then filtrated through a filter (average pore diameter=3 μm) to produce aqueous ink-jet inks.

TABLE 2

| Ingredients | | Content (mass %) | | | |
|---|---|---|---|---|---|
| | | Cyan | Magenta | Yellow | Black |
| Colorant | c: DB86 | 3.0 | — | — | — |
| | m: AR92 | — | 3.0 | — | — |
| | y: DY98 | — | — | 3.0 | — |
| | d: DB168 | — | — | — | 3.0 |
| Water-soluble organic solvent | Glycerin | 28.0 | 28.0 | 28.0 | 28.0 |
| | 1,3-BD | 5.0 | 5.0 | 5.0 | 5.0 |
| Water | Ion-exchanged water | 62.0 | 62.0 | 62.0 | 62.0 |
| Additive | Citric acid | 2.0 | 2.0 | 2.0 | 2.0 |
| Total (mass %) | | 100.0 | 100.0 | 100.0 | 100.0 |

Each of the aqueous inks with ingredients shown in Table 2 contains "citric acid" as an additive, and similarly, it is speculated that carboxylic groups in citric acid chemically change the aqueous inks so as to be fixed to a base material, when they are subjected to an atmospheric plasma discharge.

—Preparation of Solvent Oils—

Materials shown in the following Table 3 are mixed together using an industrial mill at 300 rpm for 60 minutes to prepare oil-based inks, which are free from volatile solvents and are therefore not harmful to the human body.

TABLE 3

| Ingredient | | Content (mass %) | | |
|---|---|---|---|---|
| | | Black | Red | Blue |
| Colorant | Carbon black | 27 | — | — |
| | Phthalocyanine blue Blue 15:3 | 3 | — | 30 |
| | Carmine 6B Red 57:1 | — | 30 | — |
| Oil ingredient | Castor oil | 50 | 50 | 50 |
| | High-boiling point petroleum solvent (ink oil) | 20 | 20 | 20 |
| Total (mass %) | | 100 | 100 | 100 |

Each of the oil-based inks with ingredients shown in Table 3 contains a "castor oil" as an oil ingredient. This oil is a natural oil and thus contains slight amounts of free fatty acids. Also in this case, it is speculated that the carboxylic groups in such fatty acids chemically change the oil-based inks so as to be fixed to a base material, when they are subjected to an atmospheric plasma discharge.

Examples 1 to 8

As shown in FIG. 13A, a solid color of 75 mm width was printed on a paper sheet (OA paper) by a printer shown in FIG. 1 using the W/O emulsion ink prepared above, and an evaluation for ink fixing property was made on the solid color on the paper sheet.

In the printer shown in FIG. 1 a grounded electrode 7 and a non-grounded electrode 8 are placed on opposite sides of a transferring unit 3, an endless belt member of polyimide, at positions downstream from an ink supplying unit 5, with the distance from the electrode 8 to the endless belt member being 0.5 mm. In this way an energy ray-providing part 4 is constituted.

Figure 11:
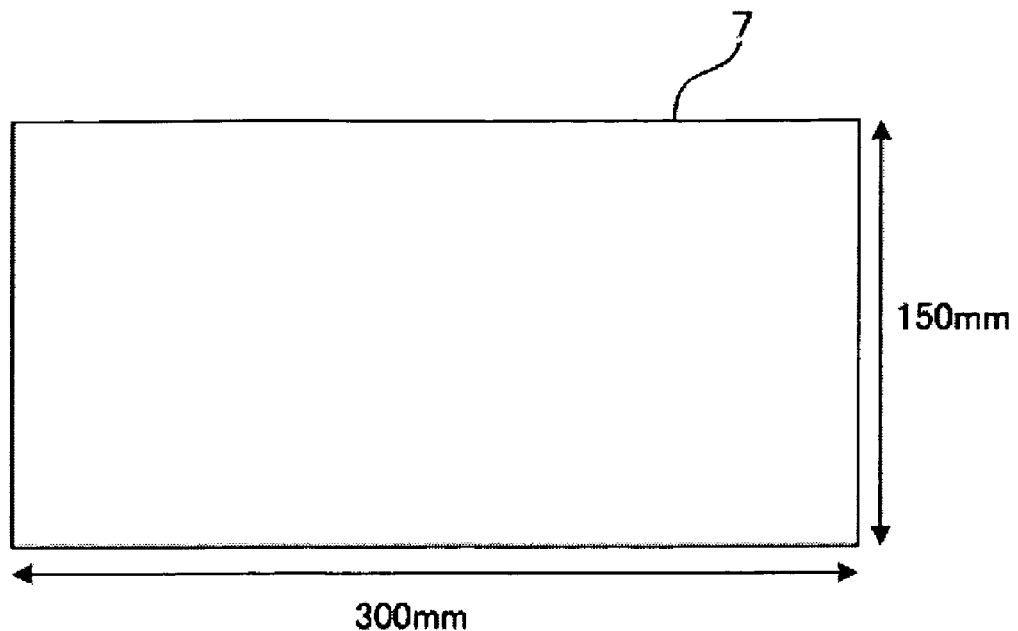
FIG. 11 is a plan view of a grounded electrode used in each Example of the present invention.
Figure 12:
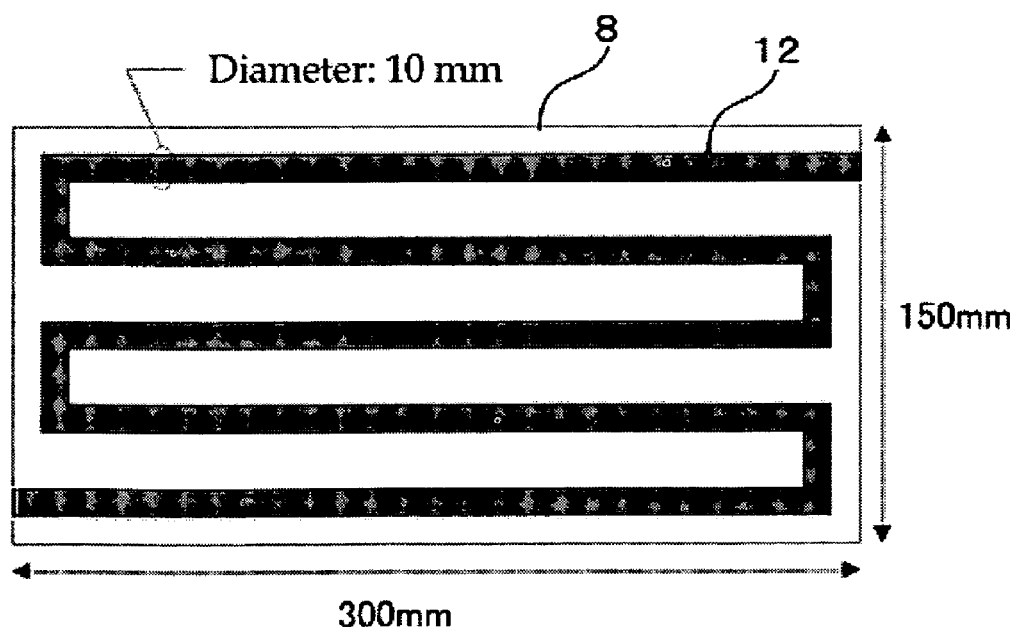
FIG. 12 is a plan view of a non-grounded electrode used in each Example of the present invention.

As shown in FIG. 11, to fabricate the grounded electrode 7, a boron oxide glass plate of 0.8 mm thickness (made of $SiO_2$ containing 9% of $B_2O_3$; permittivity=4.0-5.0) was attached to one surface of an aluminum flat plate with an area of 300 mm×150 mm, the surface facing the non-grounded electrode 8. As shown in FIG. 12, the non-grounded electrode 8 was fabricated by folding a metal pipe 12 (US pipe) of 1,500 mm length and 10 mm diameter several times such that it falls within an area of 300 mm×150 mm.

As the transferring unit 3, an endless belt member made of polyimide (thickness=0.06 mm) was wrapped around a pair of rollers.

<Printing and Ink Fixing Processes>

In the printer shown in FIG. 1, OA paper (base material) that is transferred by means of the transferring unit 3 is supplied with the print ink prepared above under the condition shown in Table 4 by means of the ink supplying unit 5. Immediately after this ink supplying operation (0.2-0.6 second), the paper sheet is provided with active energy rays, which are generated as a result of atmospheric plasma discharge, by means of the energy-ray providing part 4 of the ink fixing apparatus for ink fixing. The electrode structures and types of dielectric materials adopted in respective Examples are the same as those described above. Voltage was applied under the conditions shown in Table 4, with a rectangular waveform of 15 kHz adopted for the electrical waveform and the electrical field intensity changed among three values –100 kV/cm, 120 kV/cm, and 140 kV/cm. The printing and ink fixing processes were conducted at 20° C. at 50% humidity. The colors of solid areas on the paper sheets in respective Examples are shown in Table 4, as well as the amounts of supplied ink. The speed at which the OA paper is transferred by means of the transferring unit 3 is 100 cm/sec.

<Ink Fixing Property Evaluation 1—Evaluation by Tape Separation>

As shown in FIG. 13B, a masking tape (No. 720, produced by NITTO Co., Ltd.) was attached to the surface of the solid color, and pressed against the paper sheet at a pressure of 1.2 g/cm² using an urethane roller of 6 cm diameter, fixing the tape to the paper sheet as shown in FIG. 13C. Subsequently, as shown in FIG. 13D, the tape was peeled off in its longitudinal direction, and the ink fixing property was evaluated on the basis of the amount of ink (or ink color) trapped by the adhesive surface of the tape. The evaluation criteria are as follows:

5 . . . No ink has been transferred on the tape (the adhesive surface of the tape is white)—excellent ink fixing property 4 . . . A part of the ink has been transferred on the tape (the adhesive surface of the tape is somewhat gray)—good ink fixing property 3 . . . Half of the ink has been transferred on the tape (the adhesive surface of the tape is gray)—no practical problem 2 . . . More than half of the ink has been transferred on the tape (the adhesive surface of the tape is black and gray)—bad ink fixing property 1 . . . All of the ink has been transferred on the tape (no ink left on the paper sheet)—poor ink fixing property Examples 9 to 12

Using a printer equipped with the ink fixing apparatus shown in FIG. 2, ink fixing processes were conducted under conditions similar to those in Example 1. In Examples 9 to 12 paper sheets (OA paper) were previously supplied with the ink prepared above, which contains a non-volatile organic compound and contains no photopolymerization initiators, and allowed to stand for 8 hours for sufficient diffusion of ink. Thereafter, the paper sheets supplied with ink were introduced into the ink fixing apparatus shown in FIG. 2, and provided with active energy rays by means of the energy ray-providing part 4 for ink fixing. Ink fixing property evaluations were made on the resultant solid color as in Example 1. The obtained results are shown in Table 4.

In Examples 9 and 10, solid black colors were printed out using the W/O emulsion inks prepared above. In Examples 11 and 12, solid black colors were printed out using the aqueous inks prepared above. The electrical field intensities of the electrodes, the amounts of ink previously supplied, the ink type, etc., adopted in Examples 9 to 12 are shown in Table 4.

The electrodes used in Examples 9 to 12 were prepared by placing, as the energy ray-providing part 4, the grounded electrode 7 shown in FIG. 11 and the non-grounded electrode 8 shown in FIG. 12 in such a way that they face each other, as shown in FIG. 2.

As the transferring unit 3, an endless belt member made of polyimide (thickness=0.06 mm) was used, and the belt speed was set to 100 cm/sec.

Examples 13 to 16

In Examples 13 to 16, 200 paper sheets (OA paper) was printed out by a conventional printer rather than by the printer of the present invention, whereby each paper sheet was printed with a predetermined test pattern using the print inks prepared above, which contain a non-volatile organic compound and contain no photopolymerization initiators.

Subsequently, the paper sheets were fed into the ink fixing apparatus shown in FIG. 3, applying voltage by means of the energy-ray providing part 4, an ink fixing unit, to thereby fix the printed test patterns thereto. Thereafter, using the ink supplying unit 5, another test pattern was printed on the same side of the paper sheet at a position other than the previous test pattern. Ink fixing property evaluations were made both on the first and second test patterns in a manner described below.

The electrical field intensities of the electrodes, the amounts of ink supplied, the ink type, etc., adopted in Examples 13 to 16 are also shown in Table 4.

The electrodes used in Examples 13 to 16 were prepared by placing, as the energy ray-providing part 4, the grounded electrode 7 shown in FIG. 11 and the non-grounded electrode 8 shown in FIG. 12 on the right side of the ink supplying unit 5 in such a way that they face each other across the transferring unit 3 (belt member), as shown in FIG. 3.

As the transferring unit 3, an endless belt member made of polyimide (thickness=0.06 mm) was used, and the belt speed was set to 100 cm/sec.

<Ink Fixing Property Evaluation 2—Evaluation Based on the Ink Fixation Ratio>

Ink fixing property was evaluated by calculating the ink fixation ratio in the following manner: An eraser (MONO eraser, produced by Tombow Co., Ltd.) was pressed against the first and second test patterns of each of the first, 10th, 100th, and 200th paper sheets at a pressure of 10 N×cm, and the test patterns were rubbed back and forth for five times with the eraser to measure their ink density with Mechbeth densitometer. Ink fixing property was evaluated in this way because it is difficult to quantify the degree of "feathering" that may occur when the first and second tests patterns are superimposed.

—Evaluation Criteria—

The ink fixation ratio was defined as "b/a×100(%)" where "a" represents the density average before rubbing and "b" represents the density average after rubbing. The ink fixation ratios of the first and second test patterns and the differences in ink fixation ratio between them are shown in Table 4.

If the first test patterns have an ink fixation ratio of 80% or more and the greater the difference in ink density between the first test patterns (those that have been fixed to their paper sheets by means of the ink fixing apparatus of the present invention) and the second test patterns (those that have not been fixed to their paper sheets by means of the ink fixing apparatus of the present invention), i.e., the greater the difference in ink fixation ratio, the more likely it is that ink mixing can be prevented between the first and second test patterns, thereby determining that the likelihood of the occurrence of "feathering" is low. From this evaluation, it is learned that ink fixing property of the present invention is excellent.

Examples 17 to 22

In Examples 17 to 22, 200 paper sheets (OA paper) were printed out by a conventional printer rather than by the printer of the present invention, whereby each paper sheet was printed with a predetermined test pattern using the print inks prepared above, which contain a non-volatile organic compound and contain no photopolymerization initiators. Subsequently, the ink fixation ratio of each of the test patterns of the first, 10th, 100th, and 200th paper sheets was calculated as in Ink Fixation Property Evaluation 2.

Using the printer shown in FIG. 4, another test pattern was printed on the same side of each of the paper sheets at a position other than the test pattern printed previously.

Thereafter, the ink fixation ratio of each of the new (second) test patterns of the first, 10th, 100th, and 200th paper sheets was calculated as in Ink Fixation Property Evaluation 2. The obtained results are shown in Table 4.

The electrical field intensities of the electrodes, the amounts of ink supplied, the ink type, etc., adopted in Examples 17 to 22 are shown in Table 4.

The electrodes used in Examples 17 to 22 were prepared by placing, as the energy ray-providing part 4a, a grounded electrode 7a like that shown in FIG. 11 and a non-grounded electrode 8a like that shown in FIG. 12 in such a way that they face each other across the transferring unit (belt member) at the right side of the ink supplying unit 5 and by placing, as the energy ray-providing part 4b, a grounded electrode 7b like that shown in FIG. 11 and a non-grounded electrode 8b like that shown in FIG. 12 in such a way that they face each other across the transferring unit (belt member) at the left side of the ink supplying unit 5, as shown in FIG. 4.

As the transferring unit 3, an endless belt member made of polyimide (thickness=0.06 mm) was used, and the belt speed was set to 100 cm/sec.

With the printer shown in FIG. 4 it is possible to fix both the first test pattern that has previously been printed and the test pattern (second test pattern) printed after the first test pattern. In this case, if the first test pattern that has been fixed has an ink fixation ratio of 80% or more and the greater the difference in ink fixation ratio between the non-fixed first test pattern and the fixed second test pattern, the less likely it is that "feathering" will occur. From this evaluation, it is learned that ink fixing property of the present invention is excellent.

Examples 23 to 25

As shown in FIG. 13A, solid colors of 75 mm width were printed on paper sheets by the printer shown in FIG. 1 using the oil-based inks prepared above, and evaluations for ink fixing property were made on the solid colors as in Ink Fixing Property Evaluation 1. The obtained results are shown in Table 4.

The electrode structures and types of dielectric materials adopted in Examples 23 to 25 are the same as those in Example 1, and the electrical field intensities of the electrodes, the amounts of ink supplied, etc., adopted in Examples 23 to 25 are shown in Table 4. The speed at which the paper sheets are transferred by means of the transferring unit 3 is 100 cm/sec.

Examples 26 to 28

Using a printer equipped with the ink fixing apparatus shown in FIG. 2, ink fixing processes were conducted under conditions similar to those in Example 1. In Examples 26 to 28 paper sheets (OA paper) were previously been supplied with the inks prepared above, which contain a non-volatile organic compound and contain no photopolymerization initiators, and allowed to stand for 8 hours for sufficient diffusion of ink. Thereafter, the paper sheets supplied with ink were introduced into the ink fixing apparatus shown in FIG. 2, and provided with active energy rays by means of the energy ray-providing part 4 for ink fixing. Ink fixing property evaluations were made on the resultant solid colors as in Ink Fixing Property Evaluation 1. The obtained results are shown in Table 4.

The electrode structures and types of dielectric materials adopted in Examples 26 to 28 are the same as those in Example 9, and the electrical field intensities of the electrodes, the amounts of ink supplied, etc., adopted in Examples 26 to 28 are shown in Table 4. The speed at which the paper sheets are transferred by means of the transferring unit 3 is 100 cm/sec.

Examples 29 and 30

In Examples 29 and 30, 200 paper sheets (OA paper) were printed out by a conventional printer rather than by the printer of the present invention, whereby each paper sheet was printed with a predetermined test pattern using the print inks prepared above, which contain a non-volatile organic compound and contain no photopolymerization initiators. Subsequently, the ink fixation ratio of each of the test patterns of the first, 10th, 100th, and 200th paper sheets was calculated as in Ink Fixation Property Evaluation 2.

Using the printer shown in FIG. 4, another test pattern was printed on the same side of each of the paper sheets at a position other than the test pattern printed previously.

Thereafter, the ink fixation ratio of each of the new (second) test patterns of the first, 10th, 100th, and 200th paper sheets was calculated as in Ink Fixation Property Evaluation 2. The evaluation of "feathering" was made on the basis of the difference in ink fixation ratio between the first and second test patterns. The obtained results are shown in Table 4. The electrode structures and types of dielectric materials adopted in Examples 29 and 30 are the same as those in Example 17, and the electrical field intensities of the electrodes, the amounts of ink supplied, etc., adopted in Examples 29 and 30 are shown in Table 4. The speed at which the paper sheets are transferred by means of the transferring unit 3 is 100 cm/sec.

TABLE 4

| | Apparatus Structure | Print ink | | | Electric field intensity (kV/cm) | |
| | | Ink type | Color | Amoung of ink supplied (g/m2) | Before ink supply | After ink supply |
| --- | --- | --- | --- | --- | --- | --- |
| Ex. 1 | FIG. 1 | W/O | Black | 4 | — | 100 |
| Ex. 2 | FIG. 1 | W/O | Black | 4 | | 120 |
| Ex. 3 | FIG. 1 | W/O | Blue | 4 | | 140 |
| Ex. 4 | FIG. 1 | W/O | Red | 4 | | 120 |
| Ex. 5 | FIG. 1 | W/O | Black | 4 | | 140 |
| Ex. 6 | FIG. 1 | W/O | Blue | 4 | | 140 |
| Ex. 7 | FIG. 1 | W/O | Red | 4 | | 140 |
| Ex. 8 | FIG. 1 | W/O | Black | 4 | | 140 |
| Ex. 9 | FIG. 2 | W/O | Black | 4 | — | 100 |
| Ex. 10 | FIG. 2 | W/O | Black | 4 | | 140 |
| Ex. 11 | FIG. 2 | Aqueous | Black | 5 | | 100 |
| Ex. 12 | FIG. 2 | Aqueous | Black | 5 | | 140 |
| Ex. 13 | FIG. 3 | W/O | Black | 5 | 100 | — |
| Ex. 14 | FIG. 3 | W/O | Black | 5 | 140 | |
| Ex. 15 | FIG. 3 | Aqueous | Black | 5 | 100 | |
| Ex. 16 | FIG. 3 | Aqueous | Black | 5 | 140 | |
| Ex. 17 | FIG. 4 | W/O | Black | 4 | 100 | 100 |
| Ex. 18 | FIG. 4 | W/O | Black | 4 | 140 | 140 |
| Ex. 19 | FIG. 4 | Aqueous | Black | 5 | 140 | 140 |
| Ex. 20 | FIG. 4 | W/O | Blue | 4 | 140 | 140 |
| Ex. 21 | FIG. 4 | Aqueous | Blue | 5 | 100 | 100 |
| Ex. 22 | FIG. 4 | Aqueous | Blue | 5 | 140 | 140 |
| Ex. 23 | FIG. 1 | Solvent | Black | 4 | — | 100 |
| Ex. 24 | FIG. 1 | Solvent | Blue | 4 | | 120 |
| Ex. 25 | FIG. 1 | Solvent | Red | 4 | | 140 |
| Ex. 26 | FIG. 2 | Solvent | Black | 4 | | 140 |
| Ex. 27 | FIG. 2 | Solvent | Blue | 4 | | 140 |
| Ex. 28 | FIG. 2 | Solvent | Red | 4 | | 140 |
| Ex. 29 | FIG. 4 | Solvent | Black | 4 | 140 | 140 |
| Ex. 30 | FIG. 4 | Solvent | Blue | 4 | 140 | 140 |

TABLE 4-continued

|  | Apparatus Structure | Evaluation 1 Tape separation rank | Evaluation 2(%) | | |
|---|---|---|---|---|---|
|  |  |  | Ink fixation ratio (first test pattern) | Ink fixation ratio (second test pattern) | Evaluation for feathering |
| Ex. 1 | FIG. 1 | 3 | — | — | — |
| Ex. 2 | FIG. 1 | 5 |  |  |  |
| Ex. 3 | FIG. 1 | 5 |  |  |  |
| Ex. 4 | FIG. 1 | 5 |  |  |  |
| Ex. 5 | FIG. 1 | 5 |  |  |  |
| Ex. 6 | FIG. 1 | 5 |  |  |  |
| Ex. 7 | FIG. 1 | 5 |  |  |  |
| Ex. 8 | FIG. 1 | 5 |  |  |  |
| Ex. 9 | FIG. 2 | 3 | — | — | — |
| Ex. 10 | FIG. 2 | 5 |  |  |  |
| Ex. 11 | FIG. 2 | 3 |  |  |  |
| Ex. 12 | FIG. 2 | 5 |  |  |  |
| Ex. 13 | FIG. 3 | — | 86 | 72 | 14 |
| Ex. 14 | FIG. 3 |  | 92 | 70 | 22 |
| Ex. 15 | FIG. 3 |  | 81 | 65 | 16 |
| Ex. 16 | FIG. 3 |  | 88 | 66 | 22 |
| Ex. 17 | FIG. 4 | — | 70 | 86 | 16 |
| Ex. 18 | FIG. 4 |  | 70 | 93 | 23 |
| Ex. 19 | FIG. 4 |  | 66 | 87 | 21 |
| Ex. 20 | FIG. 4 |  | 75 | 96 | 21 |
| Ex. 21 | FIG. 4 |  | 72 | 89 | 17 |
| Ex. 22 | FIG. 4 |  | 71 | 92 | 21 |
| Ex. 23 | FIG. 1 | 5 | — | — | — |
| Ex. 24 | FIG. 1 | 5 |  |  |  |
| Ex. 25 | FIG. 1 | 5 |  |  |  |
| Ex. 26 | FIG. 2 | 5 |  |  |  |
| Ex. 27 | FIG. 2 | 5 |  |  |  |
| Ex. 28 | FIG. 2 | 5 |  |  |  |
| Ex. 29 | FIG. 4 | — | 59 | 96 | 37 |
| Ex. 30 | FIG. 4 |  | 58 | 96 | 38 |

<Evaluation for the Generation of Toxic Gas>

In the printers shown in FIGS. 1 to 4 (corresponding to Examples 2, 10, 14 and 18, respectively), the generation of toxic gases (ozone gas and NOx gases) was determined in a manner described below (the obtained results are shown in Table 5).

The printer was placed in an experimental booth (dimension: Width 1,200 mm, Depth 900 mm, Height 2,000 mm) that is hermetically sealed from the outside air with a transparent acrylic plate, and the experimental booth was fully ventilated, filling the experiment booth with clean air. Subsequently, 1,000 paper sheets (OA paper) were printed out by the printer, followed by sampling and determination of the presence of gases generated in the experimental booth in a manner described below.

In the experimental booth, three fans (6W per fan; air quantity=approximately 2.2 m³/min) are provided: two at opposite walls (right and left walls), and one around the center ceiling. These fans allow full-time uniform distribution of gases generated from the printer throughout the experimental booth.

For gas sampling, a silicon rubber tube of 9 mm inner diameter is arranged on the center ceiling such that its tip is 30 cm below from the center ceiling. An air pump can be used to recover gases in the experimental booth through this silicon rubber tube.

Note in Example 10 that paper sheets (OA paper) prepared in the following manner were employed: A solid black color of 75 mm width and 270 mm length was printed on each paper sheet using W/O ink, and the resultant sheets were allowed to stand for 8 hours at 20° C. at 50% humidity.

To eliminate the influence of potential gas before the test, the experimental booth had been well-ventilated until just before loading of the foregoing paper sheets in the printer.

In Examples 2, 14 and 18, the experimental booths were well-ventilated with paper sheets and inks being loaded in the printers, and the experimental booths were hermetically sealed from the outside just before the start of printing.

(1) The air pump was driven immediately after suspension of the printer for the collection of gases in the experimental booth in a 10L volume Tedlar® Bag (multilayered-gas sample bag with a gas inlet; no gas penetrate through or adsorb to this bag).

(2) Three gas samples were prepared (for NOx gases, ozone gas, and VOC gases).

(3) For the determination of the presence of NOx gases, a nitrogen oxide detector (APNA360, a chemiluminescence detector, manufactured by HORIBA, Ltd.) was used. In addition, a NOx gas concentration detector with a detection limit of 0.0001 ppm was used (herein a chemiluminescence detector was used that detects faint light generated as a result of contact of ozone gas from the detector and NOx gases).

(4) For ozone gas, an ozone gas detector (SC-90, manufactured by Riken Keiki Co., Ltd., a controlled potential electrolysis detector: measurement range=1 ppm, detection limit=0.02 ppm) was used.

(5) For VOC gases, a gas chromatograph (GC-14BPF, manufactured by Shimadzu Corporation, measurement range=10 ppm, detection limit=0.01 ppm) was used.

Comparative Example 1

Using a printer equipped with a conventional ink fixing mechanism that uses a metal halide lamp (output: 120 w/cm, reflection plate: cold mirror, irradiation distance: 110 mm, integrated light intensity: 1,200 mJ/cm$^2$) and with W/O emulsion inks similar to those adopted in Example 1, a solid color of 75 mm width was printed on a paper sheet (OA paper) as in Example 1, and the generation of toxic gases was determined in a manner similar to that adopted for the paper sheets of Example 1. In addition, ink fixing property was also evaluated in a manner similar to that for the paper sheets of Example 1. The obtained results are shown in Table 5.

Comparative Example 2

Using a printer equipped with a conventional ink fixing mechanism that uses an EB device for application of electron beams (acceleration voltage: 200 kV, irradiation width: 450 mm, absorption dose: 27.0 kGy) and with W/O emulsion inks similar to those adopted in Example 1, a solid color of 75 mm width was printed on a paper sheet (OA paper) as in Example 1, and the generation of toxic gases was determined in a manner similar to that for the paper sheets of Example 1. In addition, ink fixing property was also evaluated in a manner similar to that for the paper sheets of Example 1. The obtained results are shown in Table 5.

TABLE 5

|  | NOx gas conc. | Ozone gas conc. | VOC gas conc. | Inx fixing property |
|---|---|---|---|---|
| Ex. 2 | 0.11 ppm | 0.08 ppm | less than 0.01 ppm | 5 |
| Ex. 10 | 0.17 ppm | 0.08 ppm | less than 0.01 ppm | 5 |
| Ex. 14 | 0.12 ppm | 0.07 ppm | less than 0.01 ppm | 5 |
| Ex. 18 | 0.15 ppm | 0.08 ppm | less than 0.01 ppm | 5 |
| Compara. Ex. 1 | 0.05 ppm | 0.02 ppm | less than 0.01 ppm | 1 |
| Compara. Ex. 2 | 0.31 ppm | 0.48 ppm | less than 0.01 ppm | 5 |

The results listed in Tables 4 and 5 show that in Examples 1 to 30, where the ink fixing apparatus comprises at least an energy ray-providing part for applying energy rays on a surface of a base material, ink fixing operations were not inhibited by oxygen—excellent, short-time ink fixing operations were enabled. Moreover, it was found that printed sheets were free from non-cured (fixed) ink and thus negative impacts on the human body and environment due to the non-fixed ink and/or toxic gases could be effectively prevented, allowing the formation of high-quality images.

Furthermore, even black inks—inks that are difficult to be fixed to base materials—were found to be capable of being fixed to base materials with less energy while eliminating the need for a complicated apparatus and/or adjustments. Accordingly, it was found that it is possible to simplify and miniaturize ink fixing apparatus and printers and to realize efficient processing. Moreover, it was found that even solvents with poor ink fixing property like those in Examples 23 to 30 could result in excellent ink fixing effects.

Ink fixing properties were excellent particularly in Examples 2 to 8, 10, 12, 16, 16, 18, 19, 20, 22, and 25 to 30, where their electrical field intensity is set to greater than 100 kV/cm.

Ink fixing properties achieved in Examples of the present invention were found to be extremely excellent compared to Comparative Examples where printers equipped with a conventional ink fixing mechanism were used. In addition, the amounts of harmful NOx gases and ozone gas were found to be lower in the printers of Examples than in the printers of Comparative Examples; therefore, the ink fixing apparatus of the present invention is excellent in terms of the capability of reducing influences on the environment.

Example 31

A solid color of 75 mm width was printed on a paper sheet (OA paper) in a manner similar to that described in Example 1, with a gas removing unit like that described below provided to the printer shown in FIG. 1, and the generation of toxic gas was determined.

—Gas Removing Unit—

In the printer shown in FIG. 1 an air duct (an exhaustion fan; 8W, diameter=10 cm) through which gas around the electrodes is discharged was provided at a position facing the electrodes, and a filter was provided downstream of the air duct. For this filter, 5 g of titanium oxide, a photocatalyst, was adsorbed to 12.0 g of activated carbon fiber (AD'ALL, produced by UNITIKA, Ltd.). The activated carbon fiber was then formed into a cube (dimension: 10 cm length, 10 cm width, 1 cm thickness) and held to a stainless mesh of #50.

The concentrations of toxic gases in Example 35 were determined to be about 0.05 ppm for NOx gases, below 0.01 ppm for ozone gas, and below 0.01 ppm for VOC gases.

Example 32

A gas removing unit was prepared in a manner similar to that described in Example 31, with the filter prepared as follows used in stead of the foregoing filter of Example 31: About 8.7 g of natural zeolite was adsorbed to 12.0 g of activated carbon fiber (AD'ALL, produced by UNITIKA, Ltd.), and the activated carbon fiber was formed into a cube (dimension: 10 cm length, 10 cm width, 1 cm thickness) and held to a stainless mesh of #50. This gas removing unit was attached to the printer shown in FIG. 1, a solid color of 75 mm width was printed on a paper sheet (OA sheet) as in Example 1, and the generation of toxic gases was determined.

The concentrations of toxic gases in Example 35 were determined to be less than 0.01 ppm for NOx gases, below 0.01 ppm for ozone gas, and below 0.01 ppm for VOC gases.

From the results obtained from Examples 31 and 32, it was found that the additional provision of such a gas removing unit to a printer equipped with the energy ray-providing part of the present invention can significantly reduce the emission of toxic gases.

Example 33

In Example 33, a printer 10 equipped with a neutralizing brush 21 like that shown in FIG. 14A was fabricated. In the printer 10 shown in FIG. 14A, a paper sheet (base material 6) is introduced from the paper feeding side, i.e., from the inputting unit 1, to the ink supplying unit 5 for ink supplying, allowed to pass through the space between the non-grounded electrode 8 and grounded electrode 7 which constitute the energy ray-providing part 4 by means of an endless belt made of polyimide (transferring unit 3), separated from the endless belt by means of a separation claw 20 provided downstream of the endless belt, and transferred to the paper storage side (outputting unit 2).

Before the paper sheet is separated from the endless belt by means of the separation claw 20, electrical charges on the paper sheet are removed by means of the neutralizing brush 21. As shown in FIG. 14A, the neutralizing capacity of the neutralizing brush 21 can be quantified by measuring the surface potential of the paper sheet at a time immediately after it has been passed through the electrodes and at a time after removal of electrical charges by means of the neutralizing brush 21, by use of surface potential sensors 22A and 22B arranged on opposite sides of the neutralizing brush 21.

In the printer shown in FIG. 14A, the endless belt is an insulator and is in contact with the grounded electrode 7. In addition, both the separation claw 20 and rollers are electrically grounded via a support table and ball bearings, which are not illustrated.

For the neutralizing brush 21, a conductive neutralizing brush was used; Thunderon® (conductive fiber, produced by Nihon Sanmo Dyeing Co., Ltd.) was used in Example 33, which is an organic conductive fiber made from copper sulfide chemically bonded to acrylic and nylon fibers and filaments. In this Example, Thunderon® was used to form a conductive neutralizing brush, and an aluminum tape was attached thereto. This type of neutralizing brush is generally used in copiers and facsimile machines. The neutralizing brush 21 is attached to the printer 10 in such a way that its tip is in contact with a paper sheet on the endless belt, and the aluminum tape portion is grounded.

Figure 16A:
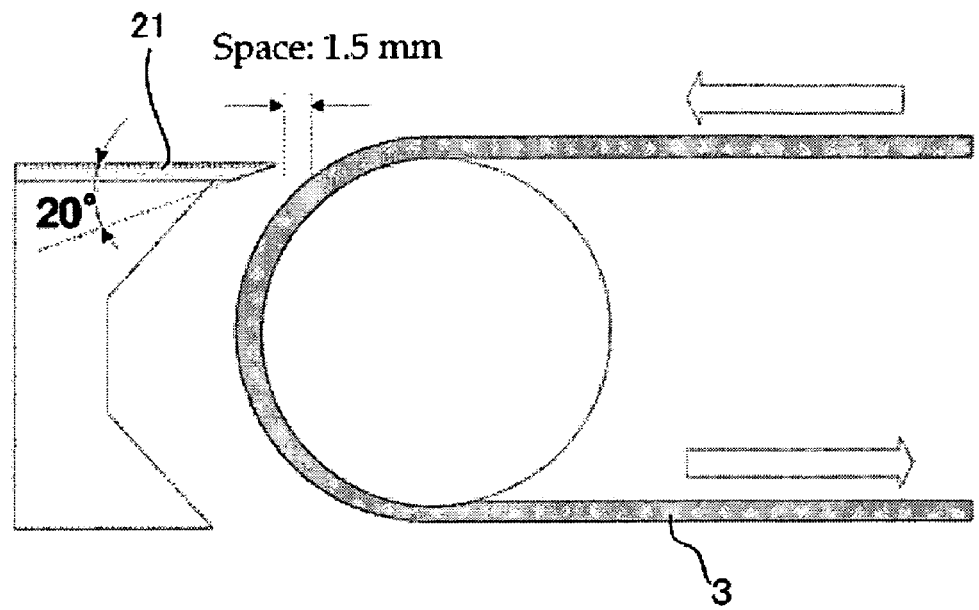
FIG. 16A is an enlarged view of an example of the arrangement of a separation claw.

The separation claw 20 shown in FIG. 16A is one obtained by sharpening the tip of a stainless plate of 1 mm thickness at an angle of about 200, so that the tip has a curvature radius (R) of 0.1 mm.

<Evaluation of Surface Potential>

High-sensitivity surface potential sensors (Model 341B, manufactured by TREK JAPAN Co., Ltd.) were adopted as the surface potential sensors 22A and 22B. Using these surface potential sensors, the surface potential of paper sheets (base material 6) that had been passed through a streamer discharge, generated as a result of voltage application (20 kV) across the discharge electrodes of the energy ray-providing part 4, were measured at times before and after the removal electrical charges with the neutralizing brush 21. Note that no ink was applied to the paper sheets by means of the ink supplying unit 5 in order to ensure that only the neutralizing capacity of the neutralizing brush 21 could be evaluated; voltage was applied to ink-free paper sheets for the measurement of their surface potentials. The measurement condition was as follows:

Temperature: 24° C.
Humidity: 45%
Paper type: OA paper
The number of paper sheets: 100
Print pattern: not set
Belt speed: 1,000 mm/sec (100 cm/sec)
Measurement position 1 (the position where a measurement chip of the surface potential sensor 22A is placed): 35 mm downstream from the electrodes
Measurement position 2 (the position where a measurement chip of the surface potential sensor 22B is placed): 420 mm downstream from the electrodes (i.e., 200 mm downstream from the neutralizing brush 21).

The surface potential measurements were made at a sampling frequency of 1 kHz, and average, minimum and maximum surface potentials were determined.

—Measurement Results (with Neutralizing Brush)—

At the measurement position 1 (prior to neutralization), the average surface potential was 8.7 kV (minimum=5.3 kV, maximum=9.9 kV).

At the measurement position 2 (after neutralization), the average surface potential was 0.5 kV (minimum=0.2 kV, maximum=0.9 kv).

Example 34

Ink fixing operations were conducted by applying voltage and electrical charges were removed from ink-fixed paper sheets by means of the neutralizing brush 21 in a manner similar to that described in Example 33, with test patterns actually printed by the printer shown in FIG. 14A using the ink supplying unit 5 under the condition shown below. Subsequently, the paper sheet's surface potential was measured at the measurement position 1 (35 mm downstream from the electrodes) and at the measurement position 2 (420 mm downstream from the electrodes) as described above. The measurement condition was as follows:

Temperature: 23° C.
Humidity: 52%
Paper type: OA paper
The number of paper sheets: 100
Print pattern: 25% density printing (A4 size printing, ink adopted: the W/O emulsion ink prepared above, color: black)
Belt speed: 1,000 mm/sec (100 cm/sec)

Next, 25% density printing will be described. Before explaining 25% density printing, 100% density printing will be described. 100% density printing, or solid black color printing, means printing of a print pattern consisting of black dots of 40.0 μm diameter arranged at a distance of 63.5 μm to one another, as shown in FIG. 14B(1). The average ink thickness immediately after ink has been supplied is 3 μm per dot.

On the other hand, 25% density printing adopted in this Example means printing of a black dot pattern as shown in FIG. 14B(2), where black and white dots of 40 μm diameter are arranged at a distance of 63.5 μm to one another (note that white dots represent positions where ink has not been supplied). Also in this case, the average ink thickness immediately after ink has been supplied is 3 μm per dot.

—Measurement Results (with Neutralizing Brush)—

At the measurement position 1 (prior to neutralization), the average surface potential was 6.5 kV (minimum=3.4 kV, maximum=9.9 kV).

At the measurement position 2 (after neutralization), the average surface potential was 0.2 kV (minimum=0.1 kV, maximum=0.9 kV).

Example 35

Ink fixing operations were conducted in a manner similar to that described in Example 33, with the neutralizing brush 21 removed from the printer shown in FIG. 14A to omit neutralizing operations, and the paper sheet's surface potential was measured at the measurement position 1 (35 mm downstream from the electrodes) and at the measurement position 2 (420 mm downstream from the electrodes) in the manner described above.

—Measurement Results (without Neutralizing Brush)—

At the measurement position 1, the average surface potential was 8.9 kV (minimum=6.6 kV, maximum=10.3 kV).

At the measurement position 2, the average surface potential was 4.7 kV (minimum=2.0 kV, maximum=5.9 kV).

Example 36

Printing operations (25% density printing) and ink fixing operations were conducted in a manner similar to that described in Example 34, with the neutralizing brush 21 removed from the printer shown in FIG. 14A to omit neutralizing operations, and the paper sheet's surface potential was measured at the measurement position 1 (35 mm downstream from the electrodes) and at the measurement position 2 (420 mm downstream from the electrodes) in the manner described above.

—Measurement Results (without Neutralizing Brush)—

At the measurement position 1, the average surface potential was 7.3 kV (minimum=6.5 kV, maximum=10.1 kV).

At the measurement position 2, the average surface potential was 4.9 kV (minimum=2.1 kV, maximum=5.5 kV).

The measurement results show that electrical charges were efficiently removed by the neutralizing brush 21 in Examples 33 and 34 compared to Examples 35 and 36 where no neutralizing operations were conducted. Accordingly, by combining a neutralizing unit (step) with an ink fixing unit (step), it is possible to achieve smooth, high-speed ink fixing and printing operations that are excellent in ink fixing performance as well.

Figure 16B:
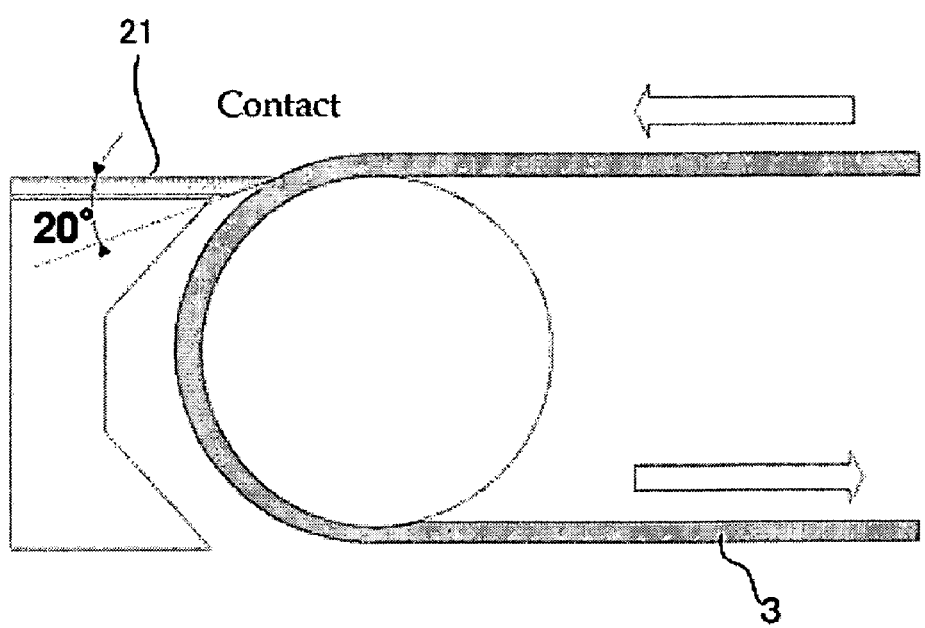
FIG. 16B is an enlarged view of an example of the arrangement of the separation claw.

Upon paper (sheet) transfer that does not involve use of the neutralizing brush 21 as in Examples 35 and 36, the separation claw 20 needs to be in contact with the belt member at all times as shown in FIG. 16B in order to readily separate a sheet from the belt member against electrostatic force. However, this may cause belt member fatigue and the rollers may be overloaded. In Examples 33 and 34 where the neutralizing brush 21 was used, by contrast, excellent neutralizing capability eliminated the need to cause the separation claw 20 to be in contact with the endless belt member, successfully creating an approximately 1.5 mm space between them as shown in FIG. 16A. Thus, the use of a separation mechanism like this can achieve smooth paper transfer without causing paper jam and can reduce belt member fatigue and loads on the rollers to improve durability of the transferring unit 3.

Example 37

In Example 37, as shown in FIG. 15, a printer 100 equipped with a neutralizing ionizer 23 and a fan duct (nozzle) 24 as neutralizing units was fabricated. The printer 100 is identical to the one shown in FIG. 14A in terms of their components (transferring unit 3, energy ray-providing part, etc.), except that a different neutralizing unit is used.

Using the printer 100 shown in FIG. 15, the surface potential of a paper sheet was measured both at a time immediately after it has been passed through the electrodes and at a time after removal of electrical charges by means of the neutralizing ionizer 23, as in Example 33. In this way the neutralizing capability of the ionizer 23 was evaluated.

For the neutralizing ionizer 23, an in-line air gun (frequency=70-80 kHz) (MODEL-3000T, manufactured by Hugle Electronic Inc.) was employed in Example 37. Dried air with a dew point of −40° C. was supplied in an amount of 5 liter per minute, and nearly equal amounts of positive and negative ions were generated from the ionizer and supplied through the fan duct (nozzle) 24 to an entire surface of sheet for neutralization.

<Surface Potential Evaluation>

High-sensitivity surface potential sensors (Model 341B, manufactured by TREK JAPAN Co., Ltd.) were adopted as the surface potential sensors 22A and 22B as in Example 33. Using these surface potential sensors, the surface potential of paper sheets (base material 6) that had been passed through a streamer discharge, generated as a result of voltage application (20 kV) across the electrodes of the energy ray-providing part 4, were measured at times before and after passing through the neutralizing ionizer 23 and fan duct (nozzle) 24. Note also in this Example that no ink was applied to the paper sheets by means of the ink supplying unit 5 in order to ensure that only the neutralizing capacity of the neutralizing ionizer 23 could be evaluated; voltage was applied to ink-free paper sheets for the measurement of their surface potentials. The measurement condition was as follows:

Temperature: 26° C.
Humidity: 52%
Paper type: OA paper
The number of paper sheets: 100
Print pattern: not set
Belt speed: 1,000 mm/sec (100 cm/sec)

Measurement position 3 (the position where a measurement chip of the surface potential sensor 22A is placed): 35 mm downstream from the electrodes Measurement position 4 (the position where a measurement chip of the surface potential sensor 22B is placed): 420 mm downstream from the electrodes (i.e., about 200 mm downstream from the neutralizing ionizer 23 and fan duct (nozzle) 24).

The surface potential measurements were made at a sampling frequency of 1 kHz, and average, minimum and maximum surface potentials were determined.

—Measurement Results (with Neutralizing Ionizer 23 and Fan Duct (Nozzle) 24)—

At the measurement position 3 (prior to neutralization), the average surface potential was 8.1 kV (minimum=6.0 kV, maximum=10.5 kV).

At the measurement position 4 (after neutralization), the average surface potential was 0.03 kV (minimum=0.0 kV, maximum=0.13 kV).

Example 38

Ink fixing operations were conducted in a manner similar to that described in Example 37, with test patterns actually printed by the printer shown in FIG. 15 using the ink supplying unit 5 under the condition shown below followed by neutralization of the ink-fixed paper sheets by means of the neutralizing brush 21. Subsequently, the paper sheet's surface potential was measured at the measurement position 3 (35 mm downstream from the electrodes) and at the measurement position 4 (420 mm downstream from the electrodes) as described above. The measurement condition was as follows:

Temperature: 24° C.
Humidity: 57%
Paper type: OA paper
The number of paper sheets: 100
Print pattern: 25% density printing (A4 size printing, ink adopted: the W/O emulsion ink prepared above, color: black)
Belt speed: 1,000 mm/sec (100 cm/sec)

25% density printing similar to that described in Example 34 was adopted.

—Measurement Results (with Neutralizing Ionizer 23 and Fan Duct (Nozzle) 24)—

At the measurement position 3 (prior to neutralization), the average surface potential was 6.3 kV (minimum=3.0 kV, maximum=10.0 kV).

At the measurement position 4 (after neutralization), the average surface potential was 0.01 kV (minimum=0.0 kV, maximum=0.05 kV).

Example 39

Ink fixing operations were conducted in a manner similar to that described in Example 37, with the operations of the neutralizing ionizer 23 and fan duct (nozzle) 24 stopped to omit neutralizing operations, and the paper sheet's surface potential was measured at the measurement position 3 (35 mm downstream from the electrodes) and at the measurement position 4 (420 mm downstream from the electrodes) in the manner described above.

—Measurement Results (without Operations of Neutralizing Ionizer 23 and Fan Duct (Nozzle) 24)—

At the measurement position 3, the average surface potential was 9.9 kV (minimum=8.3 kV, maximum=12.1 kV).

At the measurement position 4, the average surface potential was 6.7 kV (minimum=5.1 kV, maximum=7.9 kV).

Example 40

Printing operations (25% density printing) and fixing operations were conducted in a manner similar to that described in Example 38, with the operations of the neutralizing ionizer 23 and fan duct (nozzle) 24 stopped to omit neutralizing operations, and the paper sheet's surface potential was measured at the measurement position 3 (35 mm downstream from the electrodes) and at the measurement position 4 (420 mm downstream from the electrodes) in the manner described above.

—Measurement Results (without Operations of Neutralizing Ionizer 23 and Fan Duct (Nozzle) 24)—

At the measurement position 3, the average surface potential was 6.6 kV (minimum=4.0 kV, maximum=10.1 kV).

At the measurement position 4, the average surface potential was 6.7 kV (minimum=4.0 kV, maximum=9.9 kV).

The measurement results show that electrical charges were efficiently removed by the neutralizing ionizer 23 and fan duct (nozzle) 24 in Examples 37 and 38 compared to Examples 39 and 40 where no neutralizing operations were conducted. Accordingly, by combining a neutralizing unit (step) with an ink fixing unit (step), it is possible to achieve smooth, high-speed ink fixing and printing operations that are also excellent in ink fixing performance.

As shown in FIG. 16B, the separation claw 20 needs to be always in contact with the belt member in Examples 39 and 40. In Examples 37 and 38, by contrast, excellent neutralizing capability eliminated the need to cause the separation claw 20 to be in contact with the endless belt member, successfully creating an approximately 1.5 mm space between them as shown in FIG. 16A. Thus, the use of a separation mechanism like this can achieve smooth paper transfer without causing paper jam and can reduce belt member fatigue and loads on the rollers to improve durability of the transferring unit 3.

Example 41

Figure 17:
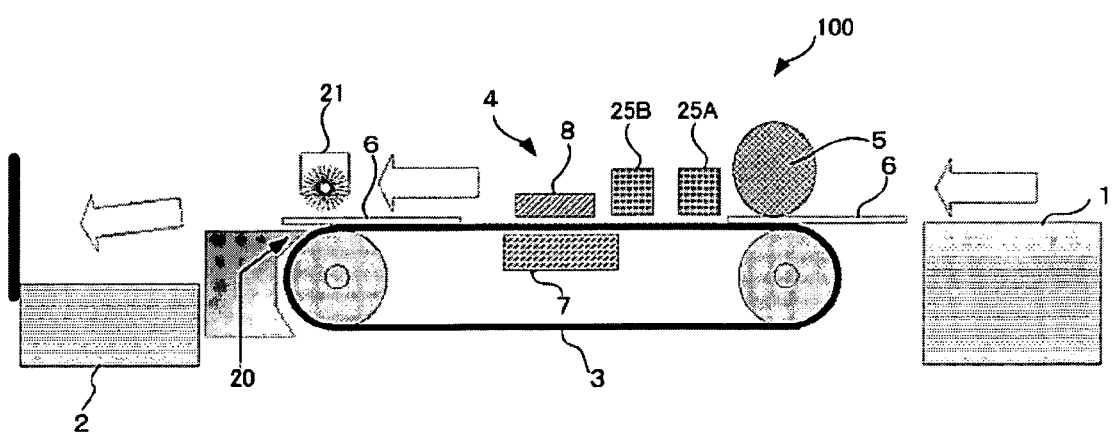
FIG. 17 is an enlarged view of another example of the arrangement of the separation claw.

In Example 41, as shown in FIG. 17, a printer equipped with an operation controlling unit was fabricated. This printer includes the neutralizing brush 21, energy ray-providing part 4 (ink fixing unit of the present invention), ink supplying unit 5, transferring unit 3 consisting of an endless belt made of polyimide and rollers, separation claw 20, etc., as does the printer 100 shown in FIG. 14A. Moreover, as operation controlling units for controlling the energy ray-providing part 4 by detecting a paper sheet (base material 6) the printer of this Example includes identical non-contact sensors 25A and 25B between the ink supplying unit 5 and the energy ray-providing part 4. The non-contact sensors 25A and 25B may be electrical non-contact sensors, magnetic non-contact sensors, or optical non-contact sensors.

Although it is sufficient to provide only one such non-contact sensor, provision of two non-contact sensors may lead to enhanced resistance to noise, increased sensitivity, and increased reliability by obtaining a differential signal from them. It is also possible to monitor the paper transferring speed and thus to control an ink fixing discharge more precisely.

One of the non-contact sensors near the paper feed side (or inputting unit 1 side) is defined as the non-contact sensor 25A (hereinafter referred to as a "sensor 25A"), and the other non-contact sensor near the electrodes is defined as the non-contact sensor 25B (hereinafter referred to as a "sensor 25B").

When no paper sheets are introduced, neither one of these sensors 25A and 25B detects any paper sheet, and thus subtraction of their output signals substantially equals to zero.

At the time when a paper sheet has been introduced and reached the sensor 25A, the other sensor, the sensor 25B, has not detected the paper sheet. Thus, subtraction of their output signals yields an output signal.

At the time when the paper sheet has reached the sensor 25B, both the sensors 25A and 25B detect the paper sheet and thus subtraction of their output signals again equals to zero.

When sheet transfer further proceeds, the paper sheet positions directly below the sensor 25B, but not below the sensor 25A. Subtraction of their output signals in this state yields an output signal.

After completion of paper transfer, neither the sensor 25A nor the sensor 25B detects the paper sheet, and thus subtraction of their output signals substantially equals to zero.

More specifically, the presence of a differential signal changes as follows: No→YES (IN)→No→(paper sheet has entered the space between the electrodes)→YES (OUT)→No (paper sheet is being transferred to the outputting unit 2). Determining whether the differential signal is negative or positive gives "IN" (provided A-B>0) and "OUT" (provided A-B<0), which are in turn assigned "ON" and "OFF" of the operation controlling unit, respectively. Note, however, that depending on the sensor positions and the belt speed, there may be a time lag that prevents complete ink fixing performance. In that case, it is proper to control ON and OFF of the electrodes' operation with such a time lag taken into consideration.

In Example 41 electrostatic capacitance sensors (K.mecs Co., Ltd.) were employed as the electrical non-contact sensors 25A and 25B. These sensors can determine changes in electrostatic capacitance between a polyimide belt member and a paper sheet on the belt member.

In Example 41 the electrodes are controlled by determining the presence of a paper sheet on the basis of the change in electrostatic capacitance between the polyimide and paper sheet. By causing the electrodes to be turned on only when non-fixed ink is present on a paper sheet in this way, it is possible to prevent wasteful consumption of electric power and to provide ink-fixing performance with increased energy efficiency.

When inks containing magnetic substance are used, it is effective to use magnetic non-contact sensors. In this case, MRS-H-21 (a magnetic sensor manufactured by NIKKOSHI Co., Ltd.) may be used. MRS-H-21 is a magnetic resistive element containing InSb and is capable of high-sensitive detection of magnetic substance contained in inks. This sensor allows direct detection of the presence of non-fixed ink rather than detection of a paper sheet, enabling more economical operation controlling.

SG113 (a reflective type photo-interrupter manufactured by KODENSHI Corp.) can be used as an optical non-contact sensor. This element is a combination of an infrared LED and phototransistors, irradiating an object with infrared light with the LED, and the reflected light can be received by the phototransistors with high sensitivity. This element controls the electrodes' operation by detecting the difference in infrared light reflectivity between polyimide and paper sheet, and can achieve precise control of the electrodes' operation even by detecting non-fixed ink on the basis of the difference in reflectivity among different print inks.

In the event that different operation controls are to be adopted for different print inks, optical non-contact sensors (photo-interrupter) are so configured that an ink portion that has been printed by regular printing using a particular ink passes immediately below any of the optical non-contact sensors without fail. Alternatively, the number of optical non-contact sensors may be increased so that all such ink portions can be covered entirely.

Example 42

Figure 18:
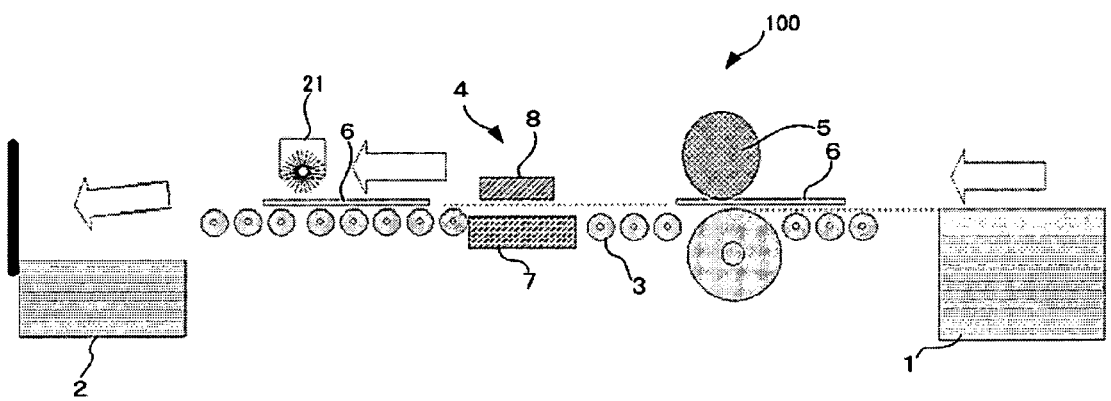
FIG. 18 is a schematic view of an example of the printer of the present invention using a contact sensor.

In Example 42, as shown in FIG. 18, a printer equipped with a contact sensor 25C was fabricated. This printer has a configuration similar to that of the printer of Example 41 shown in FIG. 17 except that the contact sensor 25C, an operation controlling unit for controlling the energy ray-providing part 4, is located substantially midway between the ink supplying unit 5 and the inputting unit 1.

For the contact sensor 25C, any of a combination of a mechanical unit with an electrical contact, a combination of a mechanical unit with a magnetic contact, and a combination of a mechanical unit with an optical sensor may be used.

By way of an example, a combination of a mechanical unit with an electrical contact is shown in FIGS. 19A(1) and 19A(2) and FIGS. 19B(1) and 19B(2). FIG. 19A(1) is a side view of such a mechanical unit (hereinafter sometimes referred to as a "mechanical detector" or a "mechanical element"), which is arranged at a position where a paper sheet passes for measurement of the weight of the paper sheet and which is consisting of an operative piece 26 and a spring 27, both formed by processing a metal plate. FIG. 19A(2) is a schematic view of the mechanical unit and electrical contact. For the electrical contact, an electrical switch was made by attaching a plate-shaped anode 28 and a plate-shaped cathode 29 to the backside of the mechanical detector and attaching a light conductive rubber sheet 30 to the backside of the mechanical detector. In a state where a paper sheet (base material 6) is not present, the operative piece 26 is biased upward by the spring 27 as shown in FIG. 19A(1) and, as shown in FIG. 19A(2), the conductive rubber sheet 30, anode 28 and cathode 29 are not electrically continuous—the electrical switch is turned off.

When a paper sheet passes above the upper surface of the operative piece 26, the operative piece 26 (mechanical detector) is pushed down against the biasing force of the spring 27 as shown in FIGS. 19(1) and 19(2), thereby establishing electrical continuity between the conductive rubber sheet 30 and the anode 28 and cathode 29 to turn on the electrical switch, as shown in FIG. 19B(2).

That the paper sheet has been transferred is recognized by receiving an ON signal, causing the energy ray-providing part 4 to operate for ink fixing.

A combination of a mechanical unit with a magnetic contact is shown in FIGS. 20(A) and 20(B). The mechanical detector of this contact sensor is constituted of a non-magnetic stainless plate (operative piece 26), and a magnetic material 31 (robber magnet) is attached to the backside thereof. A magnetic sensor 32 (MR H-21, manufactured by NIKKOSHI Co., Ltd.) is arranged below the magnetic material 31. In this magnetic sensor, as shown in FIG. 20B, the distance between the magnetic material 31 and the magnetic sensor 32 decreases when the operative piece 26 is pushed down by a paper sheet being transferred above, thereby allowing paper detection by measuring the signal differences.

In addition, a combination of a mechanical unit with an optical contact is shown in FIGS. 21(A) and 21(B). In this contact sensor a light reflecting tape 33 (aluminum deposited tape) is attached to the backside of the mechanical detector (operative piece 26), and a reflective type photo-interrupter 34 (SG113, manufactured by KODENSHI Corp.) is arranged below the light reflecting tape 33. In this magnetic sensor, as shown in FIG. 21B, the infrared light released from the photo-interrupter 34 is reflected by the light reflecting tape 33 when the operative piece 26 is pushed down by a paper sheet being transferred above, and the reflective light returns to photo-diodes incorporated into the photo-interrupter 34, whereby paper detection is made possible. When there is no paper sheets above the sensor, the backside of the operative piece 26 attached with the light reflecting tape 33 is oriented in a direction in which infrared light is not reflected toward the photo-interrupter 34. For this reason, the reflected light never returns to the photodiodes and it can therefore be determined that no paper sheets exist above the sensor.

Example 43

Although an endless belt made of polyimide is used as the transferring unit 3 for transferring paper sheets (base material) in Examples described above, roller members are used in Example 43 as shown in FIG. 22. In such a printer 100 a paper sheet (base material 6) is transferred from the paper feed side (inputting unit 1 side) to the ink supplying unit 5 for ink supplying by means of the roller members, transferred to discharge electrodes (energy rays-providing part 4) for ink fixing by means of the roller members, transferred to the neutralizing brush 21 for neutralization by means of the roller members, and transferred to the paper storage side (outputting unit 2).

To facilitate paper transfer with these roller members, it is preferable to bend a paper sheet at its center in a direction in which it is transferred for toughness.

Meanwhile, for increased electrical intensity, it is preferable to narrow the space between the grounded electrode and non-grounded electrode. In this case, however, there is a limit to how narrow this space can be, because too narrow space may cause paper jam. For this reason, the space between the grounded electrode and non-grounded electrode can be made narrower in paper transfer using a belt member—a strategy that does not involve paper bending—than in paper transfer using roller members. Thus, paper transfer by means of a belt member is more suitable for ink fixing of the present invention.

According to the present invention, it is possible to solve conventional problems and to provide a highly human- and environment-friendly ink fixing method that is excellent in energy efficiency, operability and ink-fixing property and has a simple process, an ink fixing apparatus that is excellent in energy efficiency, operability and ink-fixing property and is a highly human- and environment-friendly, simple and compact apparatus, and a printer that is equipped with the ink fixing apparatus and can provide high-quality images at low cost.

Thus, the ink fixing method of the present invention can be suitably applied to printers, coating machines, etc.

Correspondingly, the ink fixing apparatus of the present invention can also be applied to printers, coating machines, etc.

In addition, since the printer of the present invention includes the ink fixing apparatus of the present invention, it is excellent in energy efficiency, operability and ink-fixing property and is a highly human- and environment-friendly, simple and compact apparatus and thus can provide high-quality image at low cost. The printer of the present invention can therefore be applied to ink-jet printers, stencil printers (e.g., rotary stencil printers), letterpress printers, offset printers, etc.

What is claimed is:

1. An ink fixing method, comprising:
fixing a print ink to a base material by means of a discharge generated between first and second electrodes under pressure close to atmospheric pressure,
wherein the print ink comprises at least a colorant and a non-volatile organic compound bearing a carboxylic group and comprises no photopolymerization initiators, and
wherein the non-volatile organic compound can cause an esterification reaction by the discharge at atmospheric pressure.

2. The ink fixing method according to claim 1, wherein the pressure close to atmospheric pressure is 0.07 MPa to 2 MPa.

3. The ink fixing method according to claim 1, wherein the electrodes are so configured that a plurality of discharge portions having an electrical field intensity of at least greater than 100 kV/cm and a plurality of non-discharge portions are formed in a space between the electrodes.

4. The ink fixing method according to claim 1, wherein the first electrode is an electrode plate, at least a part of which is covered with a dielectric material with a thickness of 0.1 mm to 10 mm and a permittivity of 10 or less.

5. The ink fixing method according to claim 1, wherein the second electrode comprises a plurality of protrusions on a surface facing the first electrode, and
wherein the tip of each protrusion, when seen from its cross section cut by a plane that is vertical with respect to the first electrode's surface, at least has a curved portion with a curvature radius (R) of 0.5 mm to 10 mm.

6. The ink fixing method according to claim 1, wherein the second electrode is formed of at least one of a circular cylinder and a circular tube, the circular cylinder and circular tube having a diameter of 1 mm to 20 mm and being made of conductive material.

7. The ink fixing method according to claim 1, wherein the second electrode is any one of an electrode obtained by electrically connecting a plurality of rectangular conductive members; an electrode obtained by bending and electrically connecting one or more long conductive members; and an electrode obtained by electrically connecting a set of electrically connected rectangular conductive members to a bent conductive member, and
wherein the second electrode comprises a plurality of protrusions on a surface facing the first electrode, and the tip of each protrusion, when seen from its cross section cut by a plane that is vertical with respect to the first electrode's surface, at least has a curved portion with a curvature radius (R) of 0.5 mm to 10 mm.

8. The ink fixing method according to claim 1, further comprising:
transferring a base material,
wherein the transferring step is conducted at least by use of a belt member with a thickness of 0.03 mm to 5.0 mm and a relative permittivity of 10 or less.

9. The ink fixing method according to claim 8, wherein the belt member comprises at least one material selected from the group consisting of chloroprene rubber, nitrile rubber, butyl rubber, ethylenepropylenedien rubber, chlorosulfonated polyethylene, acrylic rubber, silicone rubber, fluorine rubber, natural rubber, styrene-butadiene rubber, ethylene tetrafluoride, polyamides, and polyimides.

10. The ink fixing method according to claim 8, further comprising:
neutralizing a charged base material upon termination of the transfer of the base material by means of the belt member.

11. The ink fixing method according to claim 10, wherein the neutralizing step is conducted using one of a neutralizing brush and a neutralizing ionizer.

12. The ink fixing method according to claim 1, wherein the print ink is any one of a W/O emulsion ink, an aqueous ink, and an oil-based ink.

13. The ink fixing method according to claim 1, further comprising:
removing gas which is by-products from a discharge generated between the electrodes under pressure close to atmospheric pressure.

14. The ink fixing method according to claim 13, wherein the gas removing step is conducted using an air duct which is placed at a position facing the electrodes and which is formed of any one of an exhaust duct, an exhaust fan and an outlet through which gas round the electrodes is removed.

15. The ink fixing method according to claim 14, wherein the gas removing step is conducted using a filter made of at least one material selected from the group consisting of activated carbon fiber, zeolite and photocatalysts, the filter being arranged inside the air duct through which gas around the electrodes is removed.

16. The ink fixing method according to claim 1, further comprising:
supplying an ink to a base material,
wherein the ink supplying step is at least one of stencil printing, planographic printing, letterpress printing, intaglio printing, and ink-jet printing.

17. The ink fixing method according to claim 1, further comprising:
controlling the timing for generating a discharge between the electrodes under pressure close to atmospheric pressure, by detecting a non-fixed ink present on a base material.

18. The ink fixing method according to claim 17, wherein the controlling step uses at least one of an electrical non-contact sensor, a magnetic non-contact sensor and an optical non-contact sensor to detect a non-fixed ink present on a base material for controlling the timing for generating a discharge between the electrodes under pressure close to atmospheric pressure.

19. The ink fixing method according to claim 18, wherein the controlling step uses at least one of a combination of a mechanical unit and an electrical contact or magnetic contact, and a combination of a mechanical unit and an optical sensor, to detect a non-fixed ink present on a base material for controlling the timing for generating a discharge between the electrodes under pressure close to atmospheric pressure.

20. An ink fixing apparatus using an ink fixing method, the ink fixing apparatus comprising:
an ink fixing unit configured to fix a print ink to a base material by use of a discharge generated between electrodes under pressure close to atmospheric pressure,
wherein the print ink comprises at least a non-volatile organic compound bearing a carboxylic group and comprises no photopolymerization initiators, and wherein the ink fixing method comprises:

fixing a print ink to a base material by use of a discharge generated between the electrodes under pressure close to atmospheric pressure, wherein the print ink comprises at least a non-volatile organic compound bearing a carboxylic group and comprises no photopolymerization initiators;

wherein the non-volatile organic compound can cause an esterification reaction by the discharge at atmospheric pressure.

21. A printer comprising:

an ink fixing apparatus using an ink fixing method, wherein the ink fixing apparatus comprises:

an ink fixing unit configured to fix a print ink to a base material by use of a discharge generated between electrodes under pressure close to atmospheric pressure, wherein the print ink comprises at least a non-volatile organic compound bearing a carboxylic group and comprises no photopolymerization initiators, wherein the ink fixing method comprises:

fixing a print ink to a base material by use of a discharge generated between the electrodes under pressure close to atmospheric pressure, and wherein the print ink comprises at least a non-volatile organic compound bearing a carboxylic group and comprises no photopolymerization initiators;

wherein the non-volatile organic compound can cause an esterification reaction by the discharge at atmospheric pressure.

* * * * *